US010728344B2

(12) United States Patent
Fang et al.

(10) Patent No.: US 10,728,344 B2
(45) Date of Patent: *Jul. 28, 2020

(54) SERVICE DISCOVERY METHOD, RELATED DEVICE, AND SYSTEM

(71) Applicant: Huawei Technologies Co., Ltd., Shenzhen, Guangdong (CN)

(72) Inventors: Ping Fang, Shenzhen (CN); Yunsong Yang, San Diego, CA (US); Ji Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

This patent is subject to a terminal disclaimer.

(21) Appl. No.: 15/581,671

(22) Filed: Apr. 28, 2017

(65) Prior Publication Data

US 2017/0237818 A1    Aug. 17, 2017

Related U.S. Application Data

(63) Continuation of application No. PCT/CN2015/093239, filed on Oct. 29, 2015.

(30) Foreign Application Priority Data

Oct. 31, 2014   (CN) .......................... 2014 1 0608742

(51) Int. Cl.
*H04L 29/08* (2006.01)
*H04W 4/00* (2018.01)
(Continued)

(52) U.S. Cl.
CPC .............. *H04L 67/16* (2013.01); *H04L 29/08* (2013.01); *H04L 67/141* (2013.01); *H04W 4/00* (2013.01); *H04W 76/14* (2018.02); *H04W 84/12* (2013.01)

(58) Field of Classification Search
CPC ....... H04L 29/08; H04L 67/141; H04L 67/16; H04W 4/00; H04W 76/14; H04W 84/12
See application file for complete search history.

(56) References Cited

U.S. PATENT DOCUMENTS 10,142,921 B2 * 11/2018 McCann ............... H04W 48/08
10,219,141 B2 *  2/2019 Qi ......................... H04W 48/10
(Continued)

FOREIGN PATENT DOCUMENTS

CN    102487609 A    6/2012
CN    104041136 A    9/2014
(Continued)

OTHER PUBLICATIONS

"3rd Generation Partnership Project; Technical Specification Group Services and System Aspects; Proximity-based services (ProSe); Stage 2 (Release 12)", 3GPP TS 23.303 V12.2.0, Sep. 2014, 62 pages, XP50925474.

*Primary Examiner* — Todd L Barker
(74) *Attorney, Agent, or Firm* — Kilpatrick Townsend & Stockton LLP

(57) ABSTRACT

A service discovery method includes: performing, by a service request end, service discovery separately based on different networks, for a same service; correspondingly receiving, by using each network based on which the same service can be discovered in the different networks, identifier information provided by a service providing end providing the same service, where the identifier information is used to identify the service providing end; when identifier information obtained by using at least two networks matches, determining that services discovered after service discovery is performed based on the at least two networks are the same service provided by the same service providing end; and
(Continued)

when accessing the same service at a time, performing service data transmission by using the at least two networks.

20 Claims, 16 Drawing Sheets

(51) Int. Cl.
*H04W 76/14* (2018.01)
*H04W 84/12* (2009.01)

(56) References Cited

U.S. PATENT DOCUMENTS

| | | | |
|---|---|---|---|
| 2004/0187133 A1* | 9/2004 | Weisshaar | H04L 29/06 |
| | | | 718/100 |
| 2011/0296006 A1* | 12/2011 | Krishnaswamy | H04L 45/00 |
| | | | 709/224 |
| 2014/0044114 A1* | 2/2014 | Lee | H04W 76/14 |
| | | | 370/338 |
| 2014/0146727 A1 | 5/2014 | Segev et al. | |
| 2014/0357288 A1 | 12/2014 | Ko et al. | |
| 2015/0206190 A1* | 7/2015 | Lee | H04W 48/16 |
| | | | 705/14.64 |
| 2016/0100332 A1* | 4/2016 | Yi | H04L 67/26 |
| | | | 370/338 |
| 2018/0198873 A1* | 7/2018 | Qi | H04L 67/16 |

FOREIGN PATENT DOCUMENTS

| | | |
|---|---|---|
| WO | 2008082346 A1 | 7/2008 |
| WO | 2014116714 A1 | 7/2014 |
| WO | 2014116719 A1 | 7/2014 |

* cited by examiner

SERVICE DISCOVERY METHOD, RELATED DEVICE, AND SYSTEM

CROSS-REFERENCE TO RELATED APPLICATIONS

This application is a continuation of International Application No. PCT/CN2015/093239, filed on Oct. 29, 2015, which claims priority to Chinese Patent Application No. 201410608742.2, filed on Oct. 31, 2014. The disclosures of the aforementioned applications are hereby incorporated by reference in their entireties.

TECHNICAL FIELD

The present application relates to the field of communications technologies, and in particular, to a service discovery method, a related device, and a system.

BACKGROUND

For wireless fidelity (Wi-Fi, Wireless Fidelity) communication, two network communication manners are defined in the wireless local area network standard 802.11 formulated by the Institute of Electrical and Electronics Engineers (IEEE, Institute of Electrical and Electronics Engineers). The first communication manner is an infrastructure-based communication manner. In the first communication manner, a node is used as an access point (AP, Access Point), and another node except the node is used as a station (STA, Station). The access point provides an access service, and another node is connected to the access point and connects to a network by using the access point. The second communication manner is an independent basic service set (IBSS, independent basic service set) manner. In the second communication manner, each node is an equal node, and a connection is established between every two nodes.

In a subsequent development process, for further convenience of use, the Wi-Fi alliance (WFA, Wi-Fi Alliance) formulates the Wi-Fi Direct standard based on the 802.11 standard. Based on the 802.11 standard, the Wi-Fi Direct standard further defines how two nodes discover each other and how to establish a connection. Specifically, a node may randomly send a probe message on channels 1, 6, and 11 or listen to, on channels 1, 6, and 11, a probe message sent by another node. If a node detects a probe message sent by another node and replies, it may be considered that the two nodes have discovered each other. Then, the two nodes may negotiate with each other for roles of group owner (GO, Group Owner) and group client (Group Client). Generally, a node serving as a group owner is equivalent to an access point, and a node serving as a group client is equivalent to a station. The group client node may apply to the group owner node for association, and establish a connection.

However, the Wi-Fi Direct standard implements only discovery and connection on a Wi-Fi layer, and there is no uniform standard for a service layer over the Wi-Fi layer. To resolve this problem, the WFA further formulates the Wi-Fi Direct service (WFDS, Wi-Fi Direct Service) standard. In this standard, exchange of an upper layer service is standardized based on the Wi-Fi Direct, facilitating interworking between upper layer services of various manufacturers. For example, for a file transmission service, a uniform file transmission protocol may be used.

In this way, an upper layer application may perform data transmission of an upper layer service based on a Wi-Fi connection. The following uses an application session platform (ASP, Application Session Platform) as an example. The ASP may establish an ASP session based on a Wi-Fi connection (a peer to peer (P2P, Peer to Peer) connection is used in the prior art), and transmit upper layer service data by using the established ASP session.

Further, before an ASP session is established, service discovery first needs to be performed based on P2P. FIG. 1 is a flowchart showing that a node A and a node B perform service discovery by means of P2P on a Wi-Fi layer. After service discovery, a P2P network is established between the node A and the node B, and then, an ASP session is established over the P2P connection. FIG. 2 is a flowchart showing that the WFDS establishes an ASP session over a P2P connection.

As shown in FIG. 1, the node A represents an Advertiser in the WFDS, that is, a service provider, the node B represents a Seeker in the WFDS, that is, a service seeker, P2P represents a P2P module creating a connection on a Wi-Fi level, Service represents a service module, and ASP represents an ASP module. A process in which service discovery is performed by using P2P is as follows:

S101: A Service module of the node A sends an AdvertiseService message to an ASP module of the node A, so that the ASP module of the node A can receive a service request of another node.

S102: A Service module of the node B sends a SeekService message to an ASP module of the node B, to instruct the ASP module of the node B to query a specified service.

S103: The ASP module of the node B sends, by using a P2P module of the node B, a query message used to query the specified service.

S104: The ASP module of the node A receives the query message by using a P2P module of the node A, and determines that the service queried by the node B is a service that can be provided by the node A.

S105: The ASP module of the node A sends a query response message to the P2P module of the node B by using the P2P module of the node A.

After the service discovery process, the node B determines that the service provided by the node A is a service needed by the node B, so that a P2P connection may be established between the node A and the node B, and an ASP session is established based on the established P2P connection. As shown in FIG. 2, a process of creating an ASP session is as follows:

S201: A Service module of the node B sends a ConnectSessions indication of creating an ASP session to an ASP module of the node B.

S202: After receiving the ConnectSessions indication, the ASP module of the node B exchanges a VERSION message with an ASP module of the node A.

S203: After both communication parties acknowledge versions, the ASP module of the node B sends a REQUEST_SESSION message to the ASP module of the node A to request to establish an ASP session.

S204: After receiving the REQUEST_SESSION message, the ASP module of the node A exchanges request information of the node B with a Service module of the node A, and determines to prepare for a session.

S205: The ASP module of the node A sends a session adding ADDED_SESSION message to the ASP module of the node B, to agree with the node B on creating an ASP session.

S206: The Service module of the node A exchanges information about a port used by the node A with the ASP module of the node A, and determines the used port.

S207: The ASP module of the node A sends an allowed-port ALLOWED PORT message to the ASP module of the node B, to notify the node B that the node A already turns on the port.

S208: The ASP module of the node B sends a port report PortReport message to the Service module of the node B, to tell the Service module that the node A already turns on the port, exchanges information about a port used by the node B with the Service module of the node B, and determines the used port.

S209: The ASP module of the node B sends an allowed-port ALLOWED PORT message to the ASP module of the node A, to notify the node A that the node B already turns on the port.

S210: The ASP module of the node A sends a port report PortReport message to the Service module of the node A, to tell the Service module that the port of the node B is already turned on, and the node A and the node B may perform communication.

Then, a service connection may be established and service data may be transmitted between the Service module of the node A and the Service module of the node B.

As can be seen, in the prior art, upper layer service data transmission is based on a P2P connection. When a problem occurs on the P2P connection, for example, after a P2P connection is established between the node A and the node B, a distance between the node A and the node B is increasingly large, a signal of P2P connection is weaker, and even the connection is disrupted, an upper layer service based on the P2P connection may be interrupted. Consequently, data transmission of the upper layer service relies much on a bottom layer P2P connection based on which the upper layer service is established, and flexibility is poor.

SUMMARY

Embodiments of the present disclosure provide a service discovery method, a related device, and a system, to resolve a problem in the prior art that because data transmission of an upper layer service relies much on a network connection on which the upper layer service is based, flexibility is poor.

According to a first aspect, a service discovery method is provided, including:

performing, by a service request end, service discovery separately based on different networks, for a same service;

correspondingly receiving, by using each network based on which the same service can be discovered in the different networks, identifier information provided by a service providing end providing the same service, where the identifier information is used to identify the service providing end;

when identifier information obtained by using at least two networks matches, determining, by the service request end, that services discovered after service discovery is performed based on the at least two networks are the same service provided by the same service providing end; and when accessing the same service at a time, performing service data transmission by using the at least two networks.

With reference to the first aspect, in a first possible implementation manner, the performing, by a service request end, service discovery separately based on different networks, for a same service specifically includes: sending, by a service module of the service request end, a first service discovery indication to an application session platform ASP module of the service request end; and sending, by the ASP module according to the first service discovery indication by using a preset network, a first service discovery request including the same service, where the first service discovery request carries a service identifier of the same service, and the preset network includes a network in the different networks; and the correspondingly receiving, by using each network based on which the same service can be discovered in the different networks, identifier information provided by a service providing end providing the same service specifically includes: correspondingly and separately receiving, by the ASP module by using the network based on which the same service can be discovered in the preset network, a first service discovery response sent by the service providing end, where the first service discovery response carries the identifier information.

With reference to the first possible implementation manner of the first aspect, in a second possible implementation manner, when the ASP module receives the first service discovery response by using at least one network, the method further includes: reporting, by the ASP module, a first service discovery result determined according to the first service discovery response to the service module, where the first service discovery result includes network information of each network based on which the same service can be discovered, and information about a service providing end discovered by using each network based on which the same service can be discovered; or the first service discovery result includes information about a service providing end discovered by using each network based on which the same service can be discovered; instructing, by the service module, the ASP module to establish a first ASP session with a first service providing end, where the first service providing end is determined by the service module from the reported first service discovery result, and the first service providing end is discovered by using a first network; and transmitting, by the service module by using the established first ASP session, service data of the same service discovered by using the first network.

With reference to the second possible implementation manner of the first aspect, in a third possible implementation manner, the first service discovery result further includes identifier information that is received by using the network based on which the same service can be discovered; the when identifier information obtained by using at least two networks matches, determining, by the service request end, that services discovered after service discovery is performed based on the at least two networks are the same service provided by the same service providing end specifically includes: determining, by the service module from the identifier information included in the reported first service discovery result, identifier information matching identifier information that is received by using the first network; and when the identifier information matching the identifier information that is received by using the first network is determined, determining that a service that is discovered by using a network based on which the matched identifier information is received and the service that is discovered by using the first network are the same service provided by the same service providing end; and the when accessing the same service at a time, performing service data transmission by using the at least two networks specifically includes: instructing, by the service module, the ASP module to establish a second ASP session with a second service providing end, where the second service providing end is determined by the service module from service providing ends discovered by using the network based on which the matched identifier information is received, and the second service providing end is discovered by using a second network; and transmitting, on the second ASP session, the service data transmitted on the first ASP session, to continue current service data transmission.

With reference to the second possible implementation manner of the first aspect, in a fourth possible implementation manner, the performing, by a service request end, service discovery separately based on different networks, for a same service; and correspondingly receiving, by using each network based on which the same service can be discovered in the different networks, identifier information provided by a service providing end providing the same service, where the identifier information is used to identify the service providing end specifically includes: sending, by a service module of the service request end, a first service discovery indication to an ASP module of the service request end; sending, by the ASP module according to the first service discovery indication by using at least one network, a first service discovery request including the same service, where the first service discovery request carries a service identifier of the same service; correspondingly receiving, by the ASP module by using a network based on which the same service can be discovered in the at least one network, a first service discovery response sent by the service providing end, where the first service discovery response carries the identifier information; reporting, by the ASP module, a first service discovery result determined according to the first service discovery response to the service module, where the first service discovery result includes network information of the network by using which the same service can be discovered, and information about a service providing end discovered by using the network based on which the same service can be discovered; or the first service discovery result includes information about a service providing end discovered by using the network based on which the same service can be discovered; instructing, by the service module, the ASP module to establish a first ASP session with a first service providing end, where the first service providing end is determined by the service module from the reported first service discovery result, and the first service providing end is discovered by using a first network; transmitting, by the service module by using the established first ASP session, service data of the same service discovered by using the first network; sending, by the service module, a second service discovery indication to the ASP module; sending, by the ASP module according to the second service discovery indication by using at least one network, a second service discovery request including the same service, where the second service discovery request carries the service identifier of the same service; correspondingly receiving, by the ASP module by using a network based on which the same service can be discovered in the at least one network, a second service discovery response sent by the service providing end, where the second service discovery response carries the identifier information; and reporting, by the ASP module, a second service discovery result determined according to the second service discovery response to the service module, where the second service discovery result includes network information of the network by using which the same service can be discovered and that is determined according to the received second service discovery response, information about a service providing end discovered by using the network based on which the same service can be discovered, and identifier information received by using the network based on which the same service can be discovered; or the second service discovery result includes information about a service providing end discovered by using the network based on which the same service can be discovered and that is determined according to the received second service discovery response, and identifier information received by using the network based on which the same service can be discovered.

With reference to the fourth possible implementation manner of the first aspect, in a fifth possible implementation manner, the when identifier information obtained by using at least two networks matches, determining, by the service request end, that services discovered after service discovery is performed based on the at least two networks are the same service provided by the same service providing end specifically includes: determining, by the service module from the identifier information included in the reported second service discovery result, identifier information matching identifier information that is received by using the first network; and when the identifier information matching the identifier information that is received by using the first network is determined, determining that a service that is discovered by using a network based on which the matched identifier information is received and the service that is discovered by using the first network are the same service provided by the same service providing end; and the when accessing the same service at a time, performing service data transmission by using the at least two networks specifically includes: instructing, by the service module, the ASP module to establish a second ASP session with a second service providing end, where the second service providing end is determined by the service module from service providing ends discovered by using the network based on which the matched identifier information is received, and the second providing end is discovered by using a second network; and transmitting, on the second ASP session, the service data transmitted on the first ASP session, to continue current service data transmission.

With reference to the first possible implementation manner of the first aspect, in a sixth possible implementation manner, when the ASP module receives the first service discovery response by using at least two networks, the method further includes: reporting, by the ASP module, a first service discovery result determined according to the first service discovery response to the service module, where the first service discovery result includes network information of each network based on which the same service can be discovered, information about a service providing end discovered by using each network based on which the same service can be discovered, and identifier information received by using each network based on which the same service can be discovered; or the first service discovery result includes information about a service providing end discovered by using each network based on which the same service can be discovered, and identifier information received by using each network based on which the same service can be discovered; the when identifier information obtained by using at least two networks matches, determining that services discovered after service discovery is performed based on the at least two networks are the same service provided by the same service providing end specifically includes: determining, by the service module, the matched identifier information from the reported identifier information; and when the matched identifier information is determined, determining that services discovered by using networks based on which the matched identifier information is received are the same service provided by the same service providing end; and after the determining that services discovered by using networks based on which the matched identifier information is received are the same service provided by the same service providing end, the method further includes: instructing, by the service module, the ASP module to establish an ASP session with the same service providing end providing the same service; and determining a first ASP session from ASP sessions that are established by the ASP module based on networks based on which the same service provided by the same service providing end is discovered, and transmitting, on the first ASP session established based on a first network, service data of the same service provided by the same service providing end.

With reference to the sixth possible implementation manner of the first aspect, in a seventh possible implementation manner, the when accessing the same service at a time, performing service data transmission by using the at least two networks specifically includes: transmitting, by the service module on a second ASP session, the service data transmitted on the first ASP session, to continue current service data transmission, where the second ASP session is established based on a second network, and the second network is a network determined in the networks based on which the same service provided by the same service providing end is discovered except the first network.

With reference to the first possible implementation manner of the first aspect, in an eighth possible implementation manner, when the ASP module receives the first service discovery response by using at least two networks, the method further includes: reporting, by the ASP module, a first service discovery result determined according to the first service discovery response to the service module, where the first service discovery result includes network information of each network based on which the same service can be discovered, information about a service providing end discovered by using each network based on which the same service can be discovered, and identifier information received by using each network based on which the same service can be discovered; or the first service discovery result includes information about a service providing end discovered by using each network based on which the same service can be discovered, and identifier information received by using each network based on which the same service can be discovered; the when identifier information obtained by using at least two networks matches, determining that services discovered after service discovery is performed based on the at least two networks are the same service provided by the same service providing end specifically includes: determining, by the service module, the matched identifier information from the reported identifier information; and when the matched identifier information is determined, determining that services discovered by using networks based on which the matched identifier information is received are the same service provided by the same service providing end; and after the determining that services discovered by using networks based on which the matched identifier information is received are the same service provided by the same service providing end, the method further includes: instructing, by the service module, the ASP module to establish an ASP session with the same service providing end providing the same service; and the when accessing the same service at a time, performing service data transmission by using the at least two networks specifically includes: transmitting, on the established ASP session, service data of the same service provided by the same service providing end.

With reference to the third possible implementation manner of the first aspect, the fifth possible implementation manner of the first aspect, or the seventh possible implementation manner of the first aspect, in a ninth possible implementation manner, the transmitting, on the second ASP session, the service data transmitted on the first ASP session, to continue current service data transmission specifically includes: stopping using, by the service module, a first port to exchange service data with the service providing end, where the first port is an available port, used by a service session borne on the first ASP session, of a network address corresponding to the first network; and exchanging, with the service providing end by using a second port, service data following the last service data that is exchanged with the service providing end by using the first port, where the second port is an available port, used by a service session borne on the second session, of a network address corresponding to the second network.

With reference to any one of the first aspect, or the first possible implementation manner of the first aspect to the eighth possible implementation manner of the first aspect, in a tenth possible implementation manner, the identifier information is generated by the identified service providing end based on a MAC address of the service providing end.

With reference to any one of the second possible implementation manner of the first aspect to the eighth possible implementation manner of the first aspect, in an eleventh possible implementation manner, the network by using which the same service can be discovered includes a P2P network; and the creating an ASP session based on the P2P network specifically includes: creating a P2P connection between the service request end and the service providing end; and creating the ASP session based on the established P2P connection.

With reference to any one of the first aspect, or the first possible implementation manner of the first aspect to the eighth possible implementation manner of the first aspect, in a twelfth possible implementation manner, the different networks are at least two different networks of the following different types of networks: a wired network, an infrastructure network, a P2P network, a Bluetooth network, an NFC network, an LTE network, or a Powerline network.

According to a second aspect, a data transmission method is provided, including:

providing, by a service providing end by using each network in at least two networks based on which a service request end performs service discovery for a same service provided by the service providing end, identifier information for the service request end, where the identifier information is used to identify the service providing end; and performing service data transmission for the same service by using the at least two networks.

With reference to the second aspect, in a first possible implementation manner, the providing, by a service providing end by using each network in at least two networks based on which a service request end performs service discovery for a same service provided by the service providing end, identifier information for the service request end specifically includes: receiving a service discovery request that is used to perform service discovery for the same service provided by the service providing end and that is sent by using each network in the at least two networks based on which the service request end performs service discovery; and when the service providing end determines, according to a service identifier carried in the service discovery request, that the service providing end can provide a service identified by the service identifier, sending a service discovery response to the service request end, where the service discovery response carries the identifier information.

According to a third aspect, a first service request device is provided, including:

an application session platform ASP module, configured to perform service discovery separately based on different networks, for a same service; and correspondingly receive, by using each network based on which the same service can be discovered in the different networks, identifier information provided by a service providing end providing the same service, where the identifier information is used to identify the service providing end; and a service module, configured to: when identifier information obtained by the ASP module by using at least two networks matches, determine that services discovered after service discovery is performed based on the at least two networks are the same service provided by the same service providing end; and when accessing the same service at a time, perform service data transmission by using the at least two networks.

With reference to the third aspect, in a first possible implementation manner, the service module is further configured to: before the ASP module performs service discovery, send a first service discovery indication to the ASP module; and the ASP module is specifically configured to: send, according to the first service discovery indication sent by the service module and by using a preset network, a first service discovery request including the same service, where the first service discovery request carries a service identifier of the same service, and the preset network includes a network in the different networks; and correspondingly receive, by using the network based on which the same service can be discovered in the preset network, a first service discovery response sent by the service providing end, where the first service discovery response carries the identifier information.

With reference to the first possible implementation manner of the third aspect, in a second possible implementation manner, the ASP module is further configured to: when receiving the first service discovery response by using at least one network, report a first service discovery result determined according to the first service discovery response to the service module, where the first service discovery result includes network information of each network based on which the same service can be discovered, and information about a service providing end discovered by using each network based on which the same service can be discovered, or the first service discovery result includes information about a service providing end discovered by using each network based on which the same service can be discovered; and the service module is further configured to: instruct the ASP module to establish a first ASP session with a first service providing end, and transmit, by using the established first ASP session, service data of the same service discovered by using a first network, where the first service providing end is determined by the service module from the reported first service discovery result, and the first service providing end is discovered by using the first network.

With reference to the second possible implementation manner of the third aspect, in a third possible implementation manner, the service module is specifically configured to: determine, from the identifier information included in the reported first service discovery result, identifier information matching identifier information that is received by using the first network; when the identifier information matching the identifier information that is received by using the first network is determined, determine that a service that is discovered by using a network based on which the matched identifier information is received and a service that is discovered by using the first network are the same service provided by the same service providing end; instruct the ASP module to establish a second ASP session with a second service providing end, where the second service providing end is determined by the service module from service providing ends discovered by using the network based on which the matched identifier information is received, and the second service providing end is discovered by using a second network; and transmit, on the second ASP session, the service data transmitted on the first ASP session, to continue current service data transmission, where the first service discovery result further includes identifier information that is received by using the network based on which the same service can be discovered.

With reference to the third aspect, in a fourth possible implementation manner, the service module is further configured to: before the ASP module performs service discovery, send a first service discovery indication to the ASP module; the ASP module is specifically configured to: send, according to the first service discovery indication sent by the service module and by using at least one network, a first service discovery request including the same service, where the first service discovery request carries a service identifier of the same service; correspondingly receive, by using the network based on which the same service can be discovered in the at least one network, a first service discovery response sent by the service providing end, where the first service discovery response carries the identifier information; and report a first service discovery result determined according to the first service discovery response to the service module, where the first service discovery result includes network information of the network by using which the same service can be discovered, and information about a service providing end discovered by using the network based on which the same service can be discovered, or the first service discovery result includes information about a service providing end discovered by using the network based on which the same service can be discovered; the service module is specifically configured to: after receiving the first service discovery result reported by the ASP module, instruct the ASP module to establish a first ASP session with a first service providing end, where the first service providing end is determined by the service module from the reported first service discovery result, and the first service providing end is discovered by using a first network; transmit, by using the established first ASP session, service data of the same service discovered by using the first network; and send a second service discovery indication to the ASP module; and the ASP module is specifically configured to: send, according to the second service discovery indication sent by the service module and by using at least one network, a second service discovery request including the same service, where the second service discovery request carries a service identifier of the same service; correspondingly receive, by using the network based on which the same service can be discovered in the at least one network, a second service discovery response sent by the service providing end, where the second service discovery response carries the identifier information; and report a second service discovery result determined according to the second service discovery response to the service module, where the second service discovery result includes network information of the network by using which the same service can be discovered and that is determined according to the received second service discovery response, information about a service providing end discovered by using the network based on which the same service can be discovered, and identifier information received by using the network based on which the same service can be discovered, or the second service discovery result includes information about a service providing end discovered by using the network based on which the same service can be discovered and that is determined according to the received second service discovery response, and identifier information received by using the network based on which the same service can be discovered.

With reference to the fourth possible implementation manner of the third aspect, in a fifth possible implementation manner, the service module is specifically configured to: determine, from the identifier information included in the second service discovery result reported by the ASP module, identifier information matching identifier information that is received by using the first network; when the identifier information matching the identifier information that is received by using the first network is determined, determine that a service that is discovered by using a network based on which the matched identifier information is received and a service that is discovered by using the first network are the same service provided by the same service providing end; instruct the ASP module to establish a second ASP session with a second service providing end; and transmit, on the second ASP session, the service data transmitted on the first ASP session, to continue current service data transmission, where the second service providing end is determined by the service module from service providing ends discovered by using the network based on which the matched identifier information is received, and the second providing end is discovered by using a second network.

With reference to the first possible implementation manner of the third aspect, in a sixth possible implementation manner, the ASP module is further configured to: when receiving the first service discovery response by using at least two networks, report a first service discovery result determined according to the first service discovery response to the service module, where the first service discovery result includes network information of each network based on which the same service can be discovered, information about a service providing end discovered by using each network based on which the same service can be discovered, and identifier information received by using each network based on which the same service can be discovered, or the first service discovery result includes information about a service providing end discovered by using each network based on which the same service can be discovered, and identifier information received by using each network based on which the same service can be discovered; the service module is specifically configured to: determine matched identifier information from the identifier information reported by the ASP module; and when the matched identifier information is determined, determine that services discovered by using networks based on which the matched identifier information is received are the same service provided by the same service providing end; and the service module is further configured to: after determining that the services discovered by using the networks based on which the matched identifier information is received are the same service provided by the same service providing end, instruct the ASP module to establish an ASP session with the same service providing end providing the same service; and determine a first ASP session from ASP sessions that are established by the ASP module based on the networks based on which the same service provided by the same service providing end is discovered, and transmit, on the first ASP session established based on a first network, service data of the same service provided by the same service providing end.

With reference to the sixth possible implementation manner of the third aspect, in a seventh possible implementation manner, the service module is specifically configured to: transmit, on a second ASP session, the service data transmitted on the first ASP session, to continue current service data transmission, where the second ASP session is established based on a second network, and the second network is a network determined in the networks based on which the same service provided by the same service providing end is discovered except the first network.

With reference to the first possible implementation manner of the third aspect, in an eighth possible implementation manner, the ASP module is further configured to: when receiving the first service discovery response by using at least two networks, report a first service discovery result determined according to the first service discovery response to the service module, where the first service discovery result includes network information of each network based on which the same service can be discovered, information about a service providing end discovered by using each network based on which the same service can be discovered, and identifier information received by using each network based on which the same service can be discovered, or the first service discovery result includes information about a service providing end discovered by using each network based on which the same service can be discovered, and identifier information received by using each network based on which the same service can be discovered; the service module is specifically configured to: determine matched identifier information from the identifier information reported by the ASP module; and when the matched identifier information is determined, determine that services discovered by using networks based on which the matched identifier information is received are the same service provided by the same service providing end; the service module is further configured to: after determining that the services discovered by using the networks based on which the matched identifier information is received are the same service provided by the same service providing end, instruct the ASP module to establish an ASP session with the same service providing end providing the same service; and the service module is specifically configured to transmit, on the established ASP session, service data of the same service provided by the same service providing end.

With reference to the third possible implementation manner of the third aspect, the fifth possible implementation manner of the third aspect, or the seventh possible implementation manner of the third aspect, in a ninth possible implementation manner, the service module is specifically configured to: stop using a first port to exchange service data with the service providing end, where the first port is an available port, used by a service session borne on the first ASP session, of a network address corresponding to the first network; and exchange, with the service providing end by using a second port, service data following the last service data that is exchanged with the service providing end by using the first port, where the second port is an available port, used by a service session borne on the second session, of a network address corresponding to the second network.

With reference to any one of the third aspect, or the first possible implementation manner of the third aspect to the eighth possible implementation manner of the third aspect, in a tenth possible implementation manner, the identifier information is generated by the identified service providing end based on a MAC address of the service providing end.

With reference to any one of the second possible implementation manner of the third aspect to the eighth possible implementation manner of the third aspect, in an eleventh possible implementation manner, the ASP module is specifically configured to: when the network by using which the same service can be discovered includes a P2P network, establish a P2P connection between the service request end and the service providing end; and establish an ASP session based on the established P2P connection.

With reference to any one of the third aspect, or the first possible implementation manner of the third aspect to the eighth possible implementation manner of the third aspect, in a twelfth possible implementation manner, the different networks are at least two different networks of the following different types of networks: a wired network, an infrastructure network, a P2P network, a Bluetooth network, an NFC network, an LTE network, or a Powerline network.

According to a fourth aspect, a first service providing device is provided, including:

an identifier information providing module, configured to provide, by using each network in at least two networks based on which a service request end performs service discovery for a same service provided by the service providing device, identifier information for the service request end, where the identifier information is used to identify the service providing end; and a service data transmission module, configured to: perform service data transmission for the same service by using the at least two networks.

With reference to the fourth aspect, in a first possible implementation manner, the identifier information providing module is specifically configured to: receive a service discovery request that is used to perform service discovery for the same service provided by the service providing device and that is sent by using each network in the at least two networks based on which the service request end performs service discovery; and when the service providing device determines, according to a service identifier carried in the service discovery request, that the service providing device can provide a service identified by the service identifier, send a service discovery response to the service request end, where the service discovery response carries the identifier information.

According to a fifth aspect, a service discovery system is provided, including the first service request device according to the third aspect or any possible implementation manner of the third aspect, and the first service providing device according to the fourth aspect or any possible implementation manner of the fourth aspect.

According to a sixth aspect, a second service request device is provided, including:

a transceiver, configured to perform service discovery separately based on different networks, for a same service, and correspondingly receive, by using each network based on which the same service can be discovered in the different networks, identifier information provided by a service providing end providing the same service, where the identifier information is used to identify the service providing end; and a processor, configured to: when identifier information obtained by the transceiver by using at least two networks matches, determine that services discovered after service discovery is performed based on the at least two networks are the same service provided by the same service providing end; and when accessing the same service at a time, perform service data transmission by using the at least two networks.

With reference to the sixth aspect, in a first possible implementation manner, the processor is further configured to: before the transceiver performs service discovery, send a first service discovery indication to the transceiver; and the transceiver is specifically configured to: send, according to the first service discovery indication sent by the processor and by using a preset network, a first service discovery request including the same service, where the first service discovery request carries a service identifier of the same service, and the preset network includes a network in the different networks; and correspondingly receive, by using the network based on which the same service can be discovered in the preset network, a first service discovery response sent by the service providing end, where the first service discovery response carries the identifier information.

With reference to the first possible implementation manner of the sixth aspect, in a second possible implementation manner, the transceiver is further configured to: when receiving the first service discovery response by using at least one network, report a first service discovery result determined according to the first service discovery response to the processor, where the first service discovery result includes network information of each network based on which the same service can be discovered, and information about a service providing end discovered by using each network based on which the same service can be discovered, or the first service discovery result includes information about a service providing end discovered by using each network based on which the same service can be discovered; and the processor is further configured to: instruct the transceiver to establish a first ASP session with a first service providing end; and transmit, by using the established first ASP session, service data of the same service discovered by using a first network, where the first service providing end is determined by the processor from the reported first service discovery result, and the first service providing end is discovered by using the first network.

With reference to the second possible implementation manner of the sixth aspect, in a third possible implementation manner, the processor is specifically configured to: determine, from the identifier information included in the reported first service discovery result, identifier information matching identifier information that is received by using the first network; when the identifier information matching the identifier information that is received by using the first network is determined, determine that a service that is discovered by using a network based on which the matched identifier information is received and a service that is discovered by using the first network are the same service provided by the same service providing end; instruct the transceiver to establish a second ASP session with a second service providing end, where the second service providing end is determined by the processor from a service providing end discovered by using the network based on which the matched identifier information is received, and the second service providing end is discovered by using a second network; and transmit, on the second ASP session, the service data transmitted on the first ASP session, to continue current service data transmission, where the first service discovery result further includes identifier information that is received by using the network based on which the same service can be discovered.

With reference to the sixth aspect, in a fourth possible implementation manner, the processor is further configured to: before the transceiver performs service discovery, send a first service discovery indication to the transceiver; the transceiver is specifically configured to: send, according to the first service discovery indication sent by the processor and by using at least one network, a first service discovery request including the same service, where the first service discovery request carries a service identifier of the same service; correspondingly receive, by using the network based on which the same service can be discovered in the at least one network, a first service discovery response sent by the service providing end, where the first service discovery response carries identifier information; and report a first service discovery result determined according to the first service discovery response to the processor, where the first service discovery result includes network information of the network by using which the same service can be discovered, and information about a service providing end discovered by using the network based on which the same service can be discovered, or the first service discovery result includes information about a service providing end discovered by using the network based on which the same service can be discovered; the processor is specifically configured to: after receiving the first service discovery result reported by the transceiver, instruct the transceiver to establish a first ASP session with a first service providing end, where the first service providing end is determined by the processor from the reported first service discovery result, and the first service providing end is discovered by using a first network; transmit, by using the established first ASP session, service data of the same service discovered by using the first network; and send a second service discovery indication to the transceiver; and the transceiver is specifically configured to: send, according to the second service discovery indication sent by the processor and by using at least one network, a second service discovery request including the same service, where the second service discovery request carries a service identifier of the same service; correspondingly receive, by using the network based on which the same service can be discovered in the at least one network, a second service discovery response sent by the service providing end, where the second service discovery response carries the identifier information; and report a second service discovery result determined according to the second service discovery response to the processor, where the second service discovery result includes network information of the network by using which the same service can be discovered and that is determined according to the received second service discovery response, information about a service providing end discovered by using the network based on which the same service can be discovered, and identifier information received by using the network based on which the same service can be discovered, or the second service discovery result includes information about a service providing end discovered by using the network based on which the same service can be discovered and that is determined according to the received second service discovery response, and identifier information received by using the network based on which the same service can be discovered.

With reference to the fourth possible implementation manner of the sixth aspect, in a fifth possible implementation manner, the processor is specifically configured to: determine, from the identifier information included in the second service discovery result reported by the transceiver, identifier information matching identifier information that is received by using the first network; when the identifier information matching the identifier information that is received by using the first network is determined, determine that a service that is discovered by using a network based on which the matched identifier information is received and a service that is discovered by using the first network are the same service provided by the same service providing end; instruct the transceiver to establish a second ASP session with a second service providing end; and transmit, on the second ASP session, the service data transmitted on the first ASP session, to continue current service data transmission, where the second service providing end is determined by the processor from a service providing end discovered by using the network based on which the matched identifier information is received, and the second providing end is discovered by using a second network.

With reference to the first possible implementation manner of the sixth aspect, in a sixth possible implementation manner, the transceiver is further configured to: when receiving the first service discovery response by using at least two networks, report a first service discovery result determined according to the first service discovery response to the processor, where the first service discovery result includes network information of each network based on which the same service can be discovered, information about a service providing end discovered by using each network based on which the same service can be discovered, and identifier information received by using each network based on which the same service can be discovered, or the first service discovery result includes information about a service providing end discovered by using each network based on which the same service can be discovered, and identifier information received by using each network based on which the same service can be discovered; the processor is specifically configured to: determine matched identifier information from the identifier information reported by the transceiver; and when the matched identifier information is determined, determine that services discovered by using networks based on which the matched identifier information is received are the same service provided by the same service providing end; and the processor is further configured to: after determining that the services discovered by using the networks based on which the matched identifier information is received are the same service provided by the same service providing end, instruct the transceiver to establish an ASP session with the same service providing end providing the same service; and determine a first ASP session from ASP sessions that are established by the transceiver based on the networks based on which the same service provided by the same service providing end is discovered, and transmit, on the first ASP session established based on the first network, service data of the same service provided by the same service providing end.

With reference to the sixth possible implementation manner of the sixth aspect, in a seventh possible implementation manner, the processor is specifically configured to: transmit, on the second ASP session, the service data transmitted on the first ASP session, to continue current service data transmission, where the second ASP session is established based on the second network, and the second network is a network determined in the networks based on which the same service provided by the same service providing end is discovered except the first network.

With reference to the first possible implementation manner of the sixth aspect, in an eighth possible implementation manner, the transceiver is further configured to: when receiving the first service discovery response by using at least two networks, report a first service discovery result determined according to the first service discovery response to the processor, where the first service discovery result includes network information of each network based on which the same service can be discovered, information about a service providing end discovered by using each network based on which the same service can be discovered, and identifier information received by using each network based on which the same service can be discovered, or the first service discovery result includes information about a service providing end discovered by using each network based on which the same service can be discovered, and identifier information received by using each network based on which the same service can be discovered; the processor is specifically configured to: determine matched identifier information from the identifier information reported by the transceiver; and when the matched identifier information is determined, determine that services discovered by using networks based on which the matched identifier information is received are the same service provided by the same service providing end; the processor is further configured to: after determining that the services discovered by using the networks based on which the matched identifier information is received are the same service provided by the same service providing end, instruct the transceiver to establish an ASP session with the same service providing end providing the same service; and the service module is specifically configured to transmit, on the established ASP session, service data of the same service provided by the same service providing end.

With reference to the third possible implementation manner of the sixth aspect, the fifth possible implementation manner of the sixth aspect, or the seventh possible implementation manner of the sixth aspect, in a ninth possible implementation manner, the processor is specifically configured to: stop using a first port to exchange service data with the service providing end, where the first port is an available port, used by a service session borne on the first ASP session, of a network address corresponding to the first network; and exchange, with the service providing end by using a second port, service data following the last service data that is exchanged with the service providing end by using the first port, where the second port is an available port, used by a service session borne on the second session, of a network address corresponding to the second network.

With reference to any one of the sixth aspect, or the first possible implementation manner of the sixth aspect to the eighth possible implementation manner of the sixth aspect, in a tenth possible implementation manner, the identifier information is generated by the identified service providing end based on a MAC address of the service providing end.

With reference to any one of the second possible implementation manner of the sixth aspect to the eighth possible implementation manner of the sixth aspect, in an eleventh possible implementation manner, the transceiver is specifically configured to: when the network by using which the same service can be discovered includes a P2P network, establish a P2P connection between the service request end and the service providing end; and establish an ASP session based on the established P2P connection.

With reference to any one of the sixth aspect, or the first possible implementation manner of the sixth aspect to the eighth possible implementation manner of the sixth aspect, in a twelfth possible implementation manner, the different networks are at least two different networks of the following different types of networks: a wired network, an infrastructure network, a P2P network, a Bluetooth network, an NFC network, an LTE network, or a Powerline network.

According to a seventh aspect, a second service providing device is provided, including:

a transceiver, configured to provide, by using each network in at least two networks based on which a service request end performs service discovery for a same service provided by the service providing device, identifier information for the service request end, where the identifier information is used to identify the service providing end; and a processor, configured to perform service data transmission for the same service by using the at least two networks.

With reference to the seventh aspect, in a first possible implementation manner, the transceiver is specifically configured to: receive a service discovery request that is used to perform service discovery for the same service provided by the service providing device and that is sent by using each network in the at least two networks based on which the service request end performs service discovery; and when the service providing device determines, according to a service identifier carried in the service discovery request, that the service providing device can provide a service identified by the service identifier, send a service discovery response to the service request end, where the service discovery response carries the identifier information.

According to an eighth aspect, a service discovery system is provided, including the second service request device according to the sixth aspect or any possible implementation manner of the sixth aspect, and the second service providing device according to the seventh aspect or any possible implementation manner of the seventh aspect.

Beneficial effects of the embodiments of the present disclosure include:

In the service discovery method, the related device, and the system that are provided in the embodiments of the present disclosure, a service request end performs service discovery separately based on different networks, for a same service; correspondingly receives, by using each network based on which the same service can be discovered in the different networks, identifier information provided by a service providing end providing the same service, where the identifier information is used to identify the service providing end; when identifier information obtained by using at least two networks matches, determines that services discovered after service discovery is performed based on the at least two networks are the same service provided by the same service providing end; and when accessing the same service at a time, performs service data transmission by using the at least two networks. In the service discovery method provided in the embodiments of the present disclosure, the service request end may perform service discovery by using different networks, for the same service, and determines the same service that is provided by the same service providing end and that is discovered by using different networks. Then, after service data transmission is performed by using a first network, when the first network cannot satisfy a current service data transmission requirement, because in addition to the first network, a service, that is, a current service, the same as the service provided by the same service providing end is further discovered by using another network, the service request end may switch the first network to the another network, and continue the current service data transmission by using the another network. Compared with the prior art that because a bottom layer connection on which data transmission of an upper layer service is based is disrupted, the data transmission of the upper layer service is necessarily interrupted, in the embodiments of the present disclosure, data transmission of an upper layer service does not rely much on a bottom layer connection on which the upper layer service is based, and switching of a bottom layer network enables continuous transmission of service data, thereby improving flexibility of service transmission. In addition, in some cases, service transmission may be performed by using multiple networks simultaneously, and a service may be handed over between multiple networks.

DETAILED DESCRIPTION

Embodiments of the present disclosure provide a service discovery method, a related device, and a system. The following describes exemplary embodiments of the present disclosure with reference to the accompanying drawings of the specification. It should be understood that, the exemplary embodiments described herein are merely used to describe and explain the present disclosure, rather than limiting the present disclosure. In addition, the embodiments in this application and the characteristics of the embodiments can be combined with each other if no conflict is caused.

Figure 1:
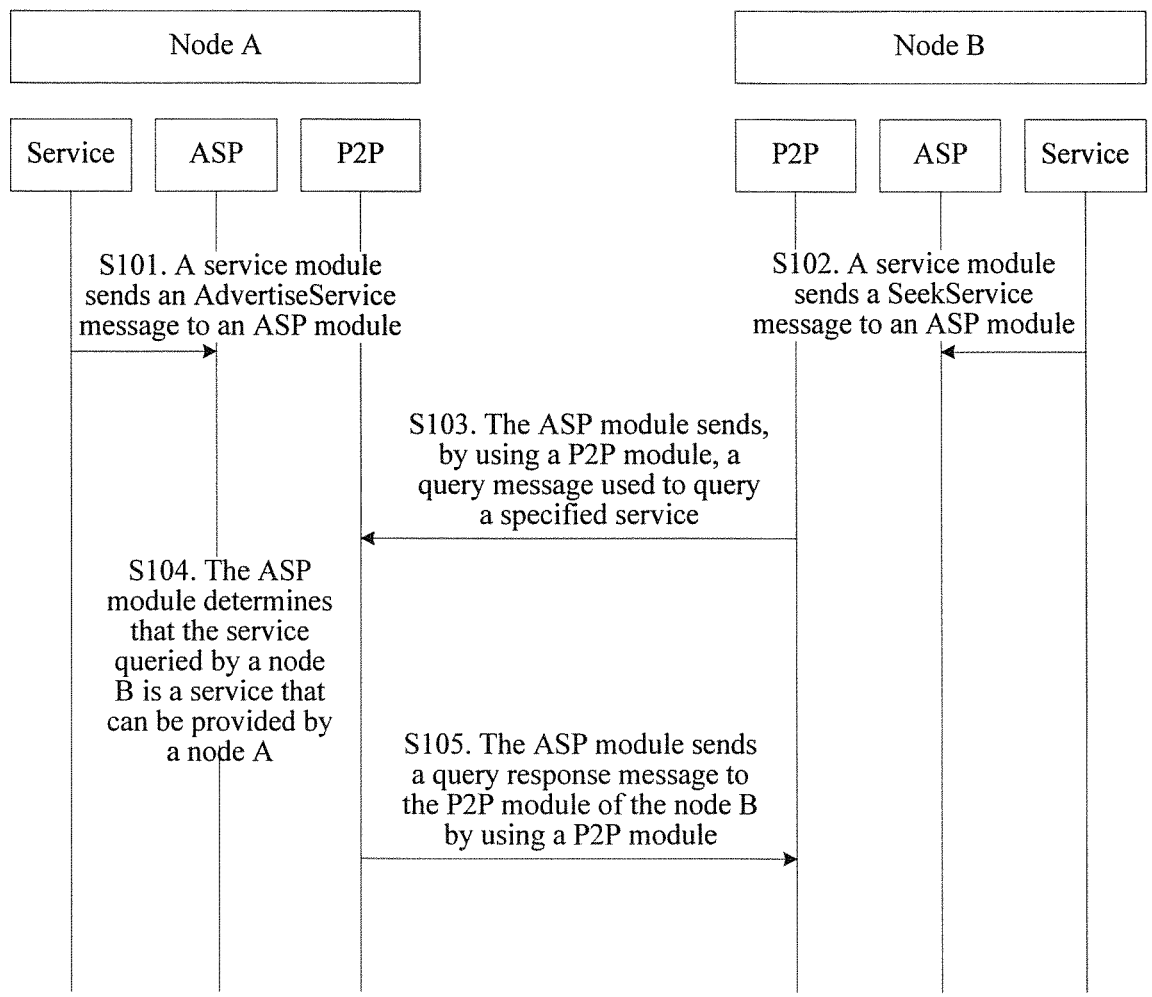
FIG. 1 is a flowchart showing that a node A and a node B perform service discovery by means of P2P on a Wi-Fi layer in the background of the present disclosure.
Figure 2:
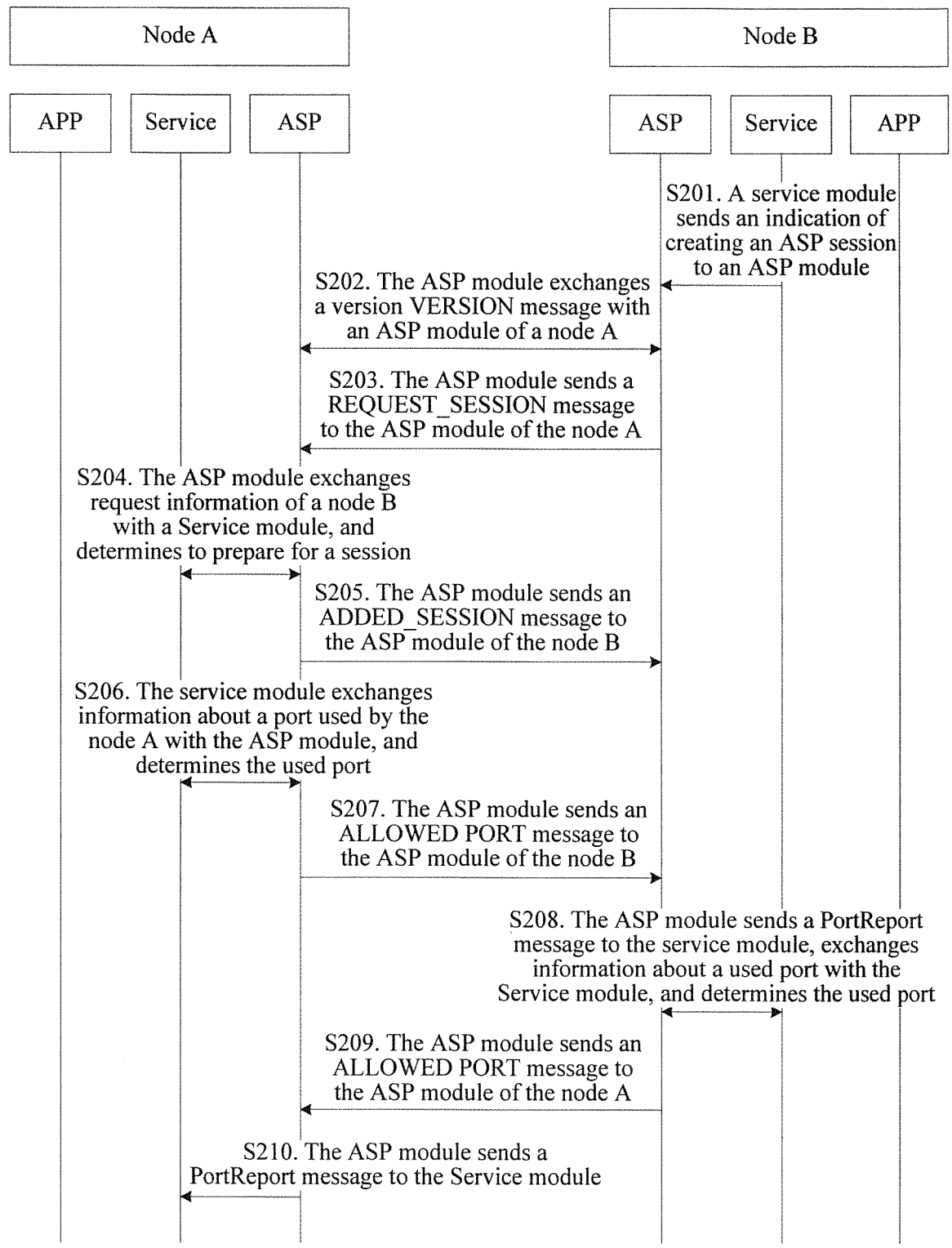
FIG. 2 is a flowchart showing that the WFDS establishes an ASP session over a P2P connection in the background of the present disclosure.
Figure 3:
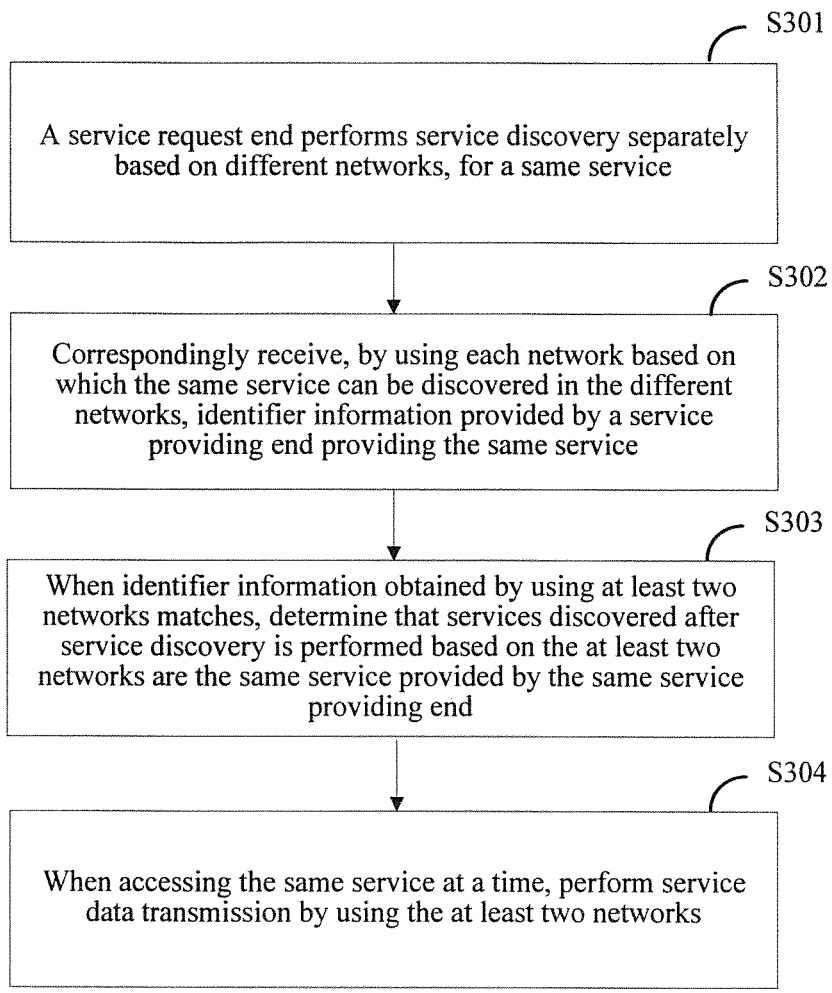
FIG. 3 is a flowchart of a service discovery method applied to a service request end according to an embodiment of the present disclosure.

An embodiment of the present disclosure provides a service discovery method, applied to a service request end. As shown in FIG. 3, the method includes:

S301: The service request end performs service discovery separately based on different networks, for a same service.

S302: Correspondingly receive, by using each network based on which the same service can be discovered in the different networks in S301, identifier information provided by a service providing end providing the same service, where the identifier information is used to identify the service providing end.

S303: When identifier information obtained by using at least two networks matches, determine that services discovered after service discovery is performed based on the at least two networks are the same service provided by the same service providing end.

S304: When accessing the same service at a time, perform service data transmission by using the at least two networks.

Figure 4:
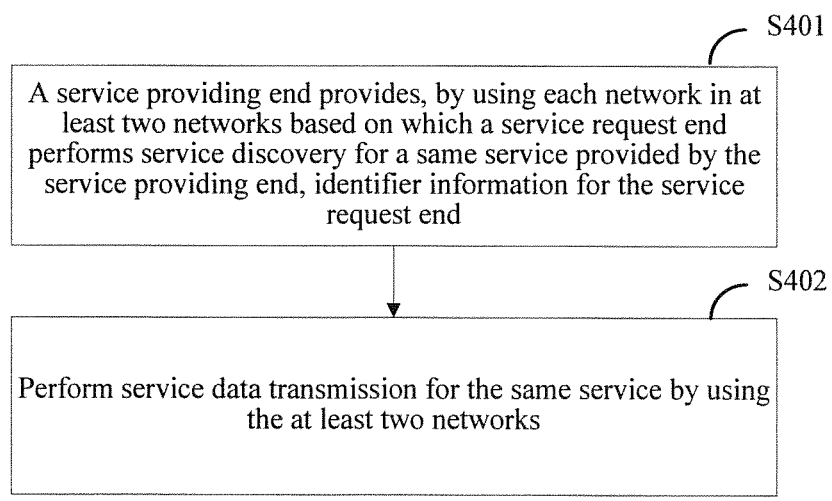
FIG. 4 is a flowchart of a service discovery method applied to a service providing end according to an embodiment of the present disclosure.

Corresponding to the method shown in FIG. 3, an embodiment of the present disclosure further provides a service discovery method, applied to a service providing end. As shown in FIG. 4, the method includes:

S401: The service providing end provides, by using each network in at least two networks based on which a service request end performs service discovery for a same service provided by the service providing end, identifier information for the service request end, where the identifier information is used to identify the service providing end.

S402: Perform service data transmission for the same service by using the at least two networks in S401.

Further, in the service discovery method provided in the embodiments of the present disclosure, the different networks may be at least two different networks of the following different types of networks: a wired network, an infrastructure (Infrastructure) network, a P2P network, a Bluetooth network, a near field communication (NFC, Near Field Communication) network, a Long Term Evolution (LTE, Long Term Evolution) network, or a powerline (Powerline) network. The infrastructure network may be an AP-based network. The P2P network, that is, the peer to peer network, may be a network established based on the Wi-Fi Direct standard, or may be a network constructed based on a neighbor awareness networking (NAN, Neighbor Awareness Networking) standard formulated by the WFA, or may be another peer to peer network. That is, the service request end may perform service discovery based on at least two types of bottom layer networks, for a same service; separately receive obtained identifier information by using each network by using which the same service can be discovered; and determine, according to the received identifier information, that discovered services are a same service that is provided by a same service providing end by using the different networks.

Further, different upper layer applications may perform service data transmission based on the different networks. When a current network bearing service data of a particular upper layer application cannot satisfy a service transmission requirement, the current network may be replaced with another network to continue current service data transmission, where a service discovered by using the another network and a service discovered by using the current network are a same service provided by a same service providing end. Service data transmission of an upper layer application does not rely much on a bottom layer network. By means of switching of the bottom layer network, the service data transmission may not be interrupted when quality of a particular network connection becomes poor or a particular network connection is disrupted, thereby improving flexibility of the service data transmission.

The following describes, in detail with reference to the accompanying drawings and specific embodiments, the method and the related device that are provided in the present disclosure.

Embodiment 1

In Embodiment 1 of the present disclosure, using an ASP as an example, a service discovery method is provided, applied to a service request end. In Embodiment 1, first, a first ASP session may be established based on a first network, service data is transmitted on the first ASP session, and when the first network cannot satisfy a service requirement, an ASP session is established based on a second network, where a service discovered by using the second network and a service discovered by using the first network are a same service provided by a same service providing end, and transmission of current service data is continued by using the second ASP session.

Figure 5:
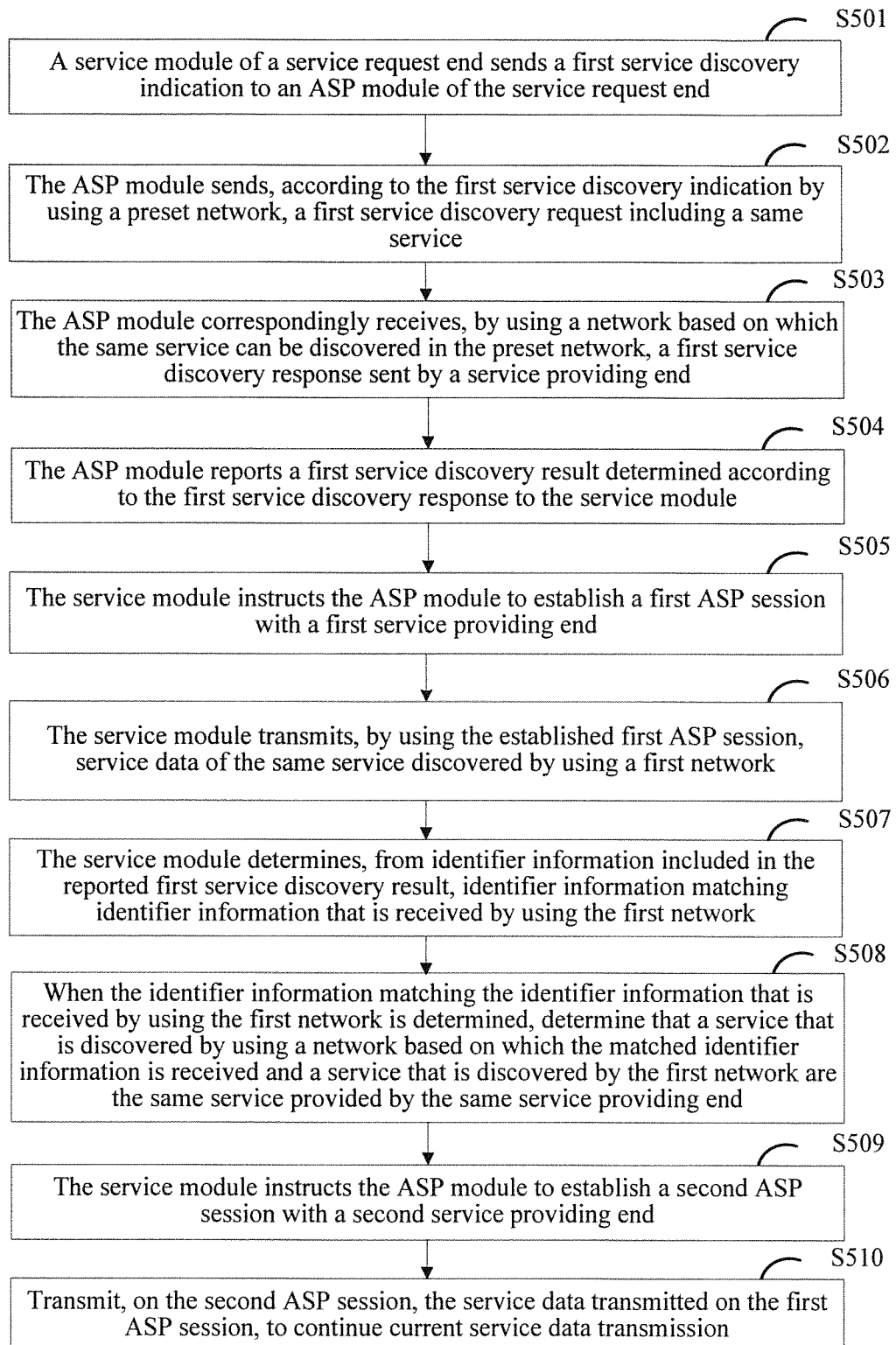
FIG. 5 is a flowchart of a service discovery method applied to a service request end according to Embodiment 1 of the present disclosure.

The service discovery method provided in Embodiment 1 is applied to the service request end. As shown in FIG. 5, the method specifically includes the following steps:

S501: A service module of the service request end sends a first service discovery indication to an ASP module of the service request end.

S502: The ASP module sends, according to the first service discovery indication received in S501 and by using a preset network, a first service discovery request including a same service.

The first service discovery request carries a service identifier of the same service, and the preset network includes a network in different networks.

Further, in this step, the service request end may connect to multiple different types of networks (for example, a wired network, an infrastructure network having an AP, a P2P network, a Bluetooth network, an NFC network, an LTE network, and a Powerline network) at the same time. When the ASP module receives the first service discovery indication sent by the service module, the ASP module may perform service discovery for the same service by using a preset network and according to a service (for example, a file transmission service) that needs to be discovered according to the first service discovery indication, where the preset network may be set in advance, and the preset network may be all different networks to which the service request end connects, or may be some preset networks (the some networks may be one or more networks) to which the service request end connects, or the like. During specific implementation, a service discovery request for the same service may be sent by using the preset network, and the service discovery request carries a same service identifier, to ensure that services discovered by using the preset network are the same service, where the service identifier may be a service name (ServiceName), may be a service hash value (ServiceHash), or may be another identifier that can identify the same service. The service hash value may be a hash value obtained after a hash operation is performed on the service name. The hash operation may be a result obtained after operation is performed by using a normal hash function, for example, the message-digest algorithm 5 (MD5, Message-Digest Algorithm 5), the secure hash algorithm 256 (SHA256, Secure Hash Algorithm), or the secure hash algorithm 512 (SHA512, Secure Hash Algorithm), or a resulted obtained when interception is performed after the operation.

Further, the ASP module may determine, by using a preset discovery rule, a network to which the service request end connects. For example, the ASP module may periodically query the network to which the service request end connects, or when it is determined that a network on which a current ASP session is based cannot satisfy a transmission requirement, query the network to which the service request end connects, or the service module periodically sends a network query indication to the ASP module, and the ASP module queries, according to the received query indication, the network to which the service request end connects, or when receiving the first service discovery indication sent by the service module, the ASP module queries the network to which the service request end connects, or the like.

Further, in this step, the first service discovery request may include service discovery for multiple types of services, and the first service discovery request sent by using the preset network includes service discovery for the same service.

Further, when the service request end device connects to only two different networks, the preset network is the two different networks; or when the service request end device connects to only one network, the preset network is the one network.

Further, in this step, the first service discovery request represents a request used to perform service discovery by using a network, and any message that can be used to perform service discovery by using a network can be used as the first service discovery request in this embodiment of the present disclosure.

S503: The ASP module correspondingly and separately receives, by using a network based on which the same service can be discovered in the preset network, a first service discovery response sent by a service providing end.

The first service discovery response carries identifier information.

Further, in this step, for the network by using which the same service can be discovered in the preset network, the ASP module receives, by using the network, the first service discovery response sent by the service providing end that is discovered by using the network and that provides the same service.

Further, in this step, the identifier information may identify the service providing end sending the first service discovery response. For example, device information (for example, a device name, a device type, or a sequence number of a device) of the service providing end sending the first service discovery response may be used as the identifier information of the service providing end, or a unique device address of the service providing end, service identifier information related to the device, a combination of multiple pieces of the foregoing information (for example, the device address of the service providing end and the service information), or other information that can identify the service providing end may be used as the identifier information of the service providing end.

Further, the service providing end may generate the identifier information based on a Media Access Control (MAC, Media Access Control) address of the service providing end by using a preset algorithm. For example, the identifier information may be directly the MAC address, or a value obtained after the MAC address is processed, or the MAC address and the service identifier, or a value obtained after the MAC address and the service identifier are processed together.

Further, in this step, after sending the first service discovery request by using a network, the ASP module waits to receive, by using the network, a response of the service providing end. If the service providing end provides, by using the network, a service that the service discovery request requests to discover, the ASP module may receive the first service discovery response by using the network, where the first service discovery response is returned to the service request end by the service providing end that receives the first service discovery request sent by using the network, and the first service discovery response carries the identifier information. The identifier information may represent the identifier information of the service providing end, or may represent the identifier information of the service providing end and service information of a requested service.

Herein, there may be a central device in the network, for example, an AP. The AP previously receives service information registered by another service providing end and information about the service providing end, and helps the service providing end in responding to a service discovery request. When the AP includes information about another service providing end that can provide the service included in the service discovery request, the AP responds to the service discovery request and sends a service discovery response. The service discovery response includes the information about the service providing end that can provide the service. When the AP does not include information about another service providing end that can provide the service included in the service discovery request, the AP still sends the service discovery response, but the response does not include the information about the service providing end.

When the identifier information represents the identifier information of the service providing end, because the first service discovery request carries the service identifier representing the same service, after the first service discovery request is sent for the same service by using different networks, when identifier information carried in first service discovery responses for the same service that are received by using at least two networks matches, it may be determined that services discovered by using the at least two networks are the same service provided by the same service providing end. When the identifier information represents the identifier information of the service providing end and the service information of the requested service, the identifier information not only represents the service providing end providing the service, but also represents the provided service, and after the first service discovery request is sent for the same service by using different networks, when identifier information carried in first service discovery responses for a specific service that are received by using at least two networks matches, it may be determined that services discovered by using the at least two networks are the same service provided by the same service providing end.

Further, during specific implementation, the first service discovery request may be a probe request (Probe Request), or a Service Discovery Request, or a Probe Request and a Service Discovery Request. That is, for each network in the preset network, when the first service discovery request is a Probe Request, a same service identifier (for example, a service hash value) may be carried in the Probe Request sent by using the network, and the first service discovery response received by using the network correspondingly may be a probe response (Probe Response), and the identifier information is carried in the Probe Response; when the first service discovery request is a Service Discovery Request, a same service identifier (for example, a service name) may be carried in the Service Discovery Request sent by using the network, the first service discovery response received by using the network correspondingly may be a Service Discovery Response, and the identifier information is carried in the Service Discovery Response; or when the first service discovery request is a Probe Request and a Service Discovery Request, the Probe Request may be sent first, a service identifier (for example, a service hash value) is carried in the Probe Request, and a corresponding Probe Response is received by using the network, and then, the Service Discovery Request is sent, a service identifier (for example, a service name) is carried in the Service Discovery Request, a Service Discovery Response is received by using the network, and the identifier information may be carried in the Probe Response and/or the Service Discovery Response. Specific implementation may be set according to actual cases.

Further, correspondingly, the first service discovery response is used to respond to the request (which is referred to as the first service discovery request in this embodiment of the present disclosure) of performing service discovery by using a network, and any response that is used to respond to the request that is of performing service discovery by using the network may be used as the first service discovery response in this embodiment of the present disclosure.

Further, step S501 to step S503 are a process of service discovery for the same service.

S504: The ASP module reports a first service discovery result determined according to the first service discovery response to the service module.

The first service discovery result includes network information of each network based on which the same service can be discovered, and information about a service providing end discovered by using each network based on which the same service can be discovered; or the first service discovery result includes information about a service providing end discovered by using each network based on which the same service can be discovered.

Further, the first service discovery result may be determined according to the first service discovery response. The first service discovery result may include the network information of the network by using which the same service is discovered, or may not include the network information. The information about the service providing end may be network address information of the service providing end, and/or service description information of the service provided by the service providing end, or the like, and the network information may include property information, type information, or the like describing the network by using which the service providing end is discovered, for example, a P2P network, an AP network, address information, and/or other information that can describe the network.

Further, in this step, after receiving the first service discovery response that is sent by using at least one network on which service discovery is completed, the ASP module may send a first service discovery result obtained after service discovery is performed for the same service to the service module (when at least two service discovery responses are received, the first service discovery results of the service discovery for the same service may be reported to the service module once, or may be reported to the service module separately for multiple times). When the first service discovery result includes network information of each network based on which the same service is discovered, and information about a service providing end that is discovered by using the network and that provides the same service, after the service module determines a service providing end whose provided service needs to be used, the ASP module can determine the network information of the network by using which the service providing end is discovered, and establish an ASP session with the service providing end by using the network.

Further, the network information corresponding to the network based on which the same service can be discovered, information about a discovered communication providing end, and identifier information that is received by using the network may be reported by using one message or different messages. Multiple service providing ends that can provide the same service may be discovered by using one network.

S505: The service module instructs the ASP module to establish a first ASP session with a first service providing end.

The first service providing end is determined by the service module from the reported first service discovery result, and the first service providing end is discovered by using a first network.

Further, in this step, when the ASP module reports only information about a service providing end that is discovered by using a network on which service discovery is completed, or network information of a network on which service discovery is completed and information about a service providing end discovered by using the network, the ASP module determines that the network is the first network, and that a service providing end discovered by using the first network is the first service providing end (a same service providing end may be discovered by using the first network, or one service providing end may be one selected from service providing ends of multiple same services discovered by using the first network). When information about service providing ends discovered by using at least two networks on which service discovery for the same service is completed is reported, or network information of at least two networks on which service discovery for the same service is completed and information about service providing ends discovered by using the at least two networks are reported, the ASP module determines, according to a preset determining rule, the first network and the first service providing end that is discovered by using the first network, where the preset determining rule may be a sequence in which service discovery is completed on networks, or may be other information such quality information of a network connection included in the network information reported by the ASP module. An upper layer service selects one according to the information, or an upper layer service selects one from multiple networks and corresponding service providing ends according to information about previous connections, or an upper layer service selects a service providing end according to other obtained information.

Further, in this step, the creating a first ASP session may include: negotiating, by the ASP module, with a peer end ASP module on information about a service such as capability information, connection capability information, or security information, and creating the first ASP session based on the negotiated information.

S506: The service module transmits, by using the first ASP session established in S505, service data of the same service discovered by using a first network.

Further, this process specifically includes: creating, by the service module, an upper layer service session based on the established first ASP session, where the upper layer service session is established by using the first network, and data of the upper layer service is transmitted by using the first network.

S507: The service module determines, from identifier information included in the reported first service discovery result, identifier information matching identifier information that is received by using the first network.

Further, the first service discovery result may include identifier information carried in the first service discovery response that is received by using the network based on which the same service can be discovered, so that the service module can determine, according to the identifier information corresponding to different networks, whether services discovered by using the different networks are the same service provided by the same service providing end.

Further, in this step, matching may refer to that the reported identifier information received by using the network based on which the same service can be discovered is the same as the identifier information received by using the first network, or may refer to that the reported identifier information received by using the network based on which the same service can be discovered and the identifier information received by using the first network satisfy a particular operation relationship, for example, results obtained after a modulus operation is performed on the two by using a value are the same, or operation results obtained after another operation such as a Hash operation, an interception operation, or a shift operation is performed on the two pieces of identifier information are compared, and when a comparison result satisfies a particular condition, the service module may determine the identifier information matching the identifier information that is received by using the first network, and determine that a service that is discovered by using a network based on which the matched identifier information is received and a service that is discovered by using the first network are the same service provided by the same service providing end.

Further, this step may be performed according to the current service transmission requirement. The current service transmission requirement may be set according to an actual case. For example, when a signal of the first network becomes weak, and cannot satisfy the current service transmission requirement, this step may be performed, or when the service data currently needing to be transmitted increases, and a first network bandwidth is insufficient and cannot satisfy the current service transmission requirement, this step may be performed, or the current service transmission requirement is another service transmission requirement.

Further, the identifier information of the service providing end may be device information (for example, a device name, a device type, or a sequence number of the device), or a unique network address, or service identifier information related to the device, or a combination of multiple of the foregoing information, or other information used to describe the service providing end.

S508: When the identifier information matching the identifier information that is received by using the first network is determined, determine that a service that is discovered by using a network based on which the matched identifier information is received and a service that is discovered by using the first network are the same service provided by the same service providing end.

S509: The service module instructs the ASP module to establish a second ASP session with a second service providing end.

The second service providing end is determined by the service module from service providing ends discovered by using the network based on which matched identifier information is received, and the second service providing end is discovered by using a second network.

Further, the second service providing end and the service providing end that is discovered by using the first network are the same service providing end.

Further, in this step, when there is only one network based on which the matched identifier information is received except the first network, it is determined that the network is the second network. When there are at least two networks receiving the matched identifier information except the first network, the second network is determined according to a preset determining rule. The preset determining rule may be signal quality of the network, a sequence in which service discovery is completed on the networks, or the like. An upper layer service selects one according to the information, or an upper layer service selects one from multiple networks and corresponding service providing ends from information about previous connections, or an upper layer service selects a service providing end according to other obtained information. The preset determining rule used to deter nine the first network may be the same as or may be different from the preset determining rule used to determine the second network.

Further, in this step, because identifier information received by using the second network matches identifier information received by using the first network, it may be determined that a service discovered by using the second network and a service discovered by using the second network are the same service provided by the same service providing end, and the second service providing end and the first service providing end in S505 are the same service providing end.

S510: Transmit, on the second ASP session established in S509, the service data transmitted on the first ASP session, to continue current service data transmission.

Further, this step specifically includes: creating, by the service module, an upper layer service session based on the established second ASP session, and transferring a service session previously performed on the first ASP session to the second ASP service session to continue transmission, that is, transferring data transmission on the service session on the first ASP session to the service session on the second ASP session to continue transmission.

Further, this step may be specifically performed in the following manners:

Step 1: The service module of the service request end stops using a first port to exchange service data with the service providing end, where the first port is an available port, used by a service session borne on the first ASP session, of a network address corresponding to the first network.

Step 2: Exchange, with the service providing end by using a second port, service data following the last service data that is exchanged with the service providing end by using the first port, where the second port is an available port, used by a service session borne on the second session, of a network address corresponding to the second network.

Further, in the service request end, different networks may correspond to different network addresses. For example, the P2P network and the infrastructure network have different MAC addresses. When using different networks, an upper layer application may correspond to different Internet protocol (IP, Internet Protocol) addresses, and the first port used by the service session borne on the established first ASP session is the available port of the network address corresponding to the first network on which the first ASP session is based, and the second port used by the service session borne on the second ASP session is the available port of the network address corresponding to the second network on which the second ASP session is based. Because services discovered by using the first network and the second network are the same service provided by the same service providing end, when the second network needs to be used to replace the first network to continue the current service data transmission, the second port may be used to replace the first port to perform service data transmission. Although a bottom layer network is replaced, an upper layer service is not interrupted, and service data transmission is continued, thereby improving flexibility of the service data transmission.

The following describes, by using a specific application scenario exemplarily, the service discovery method provided in Embodiment 1.

Example 1

Figure 6A:
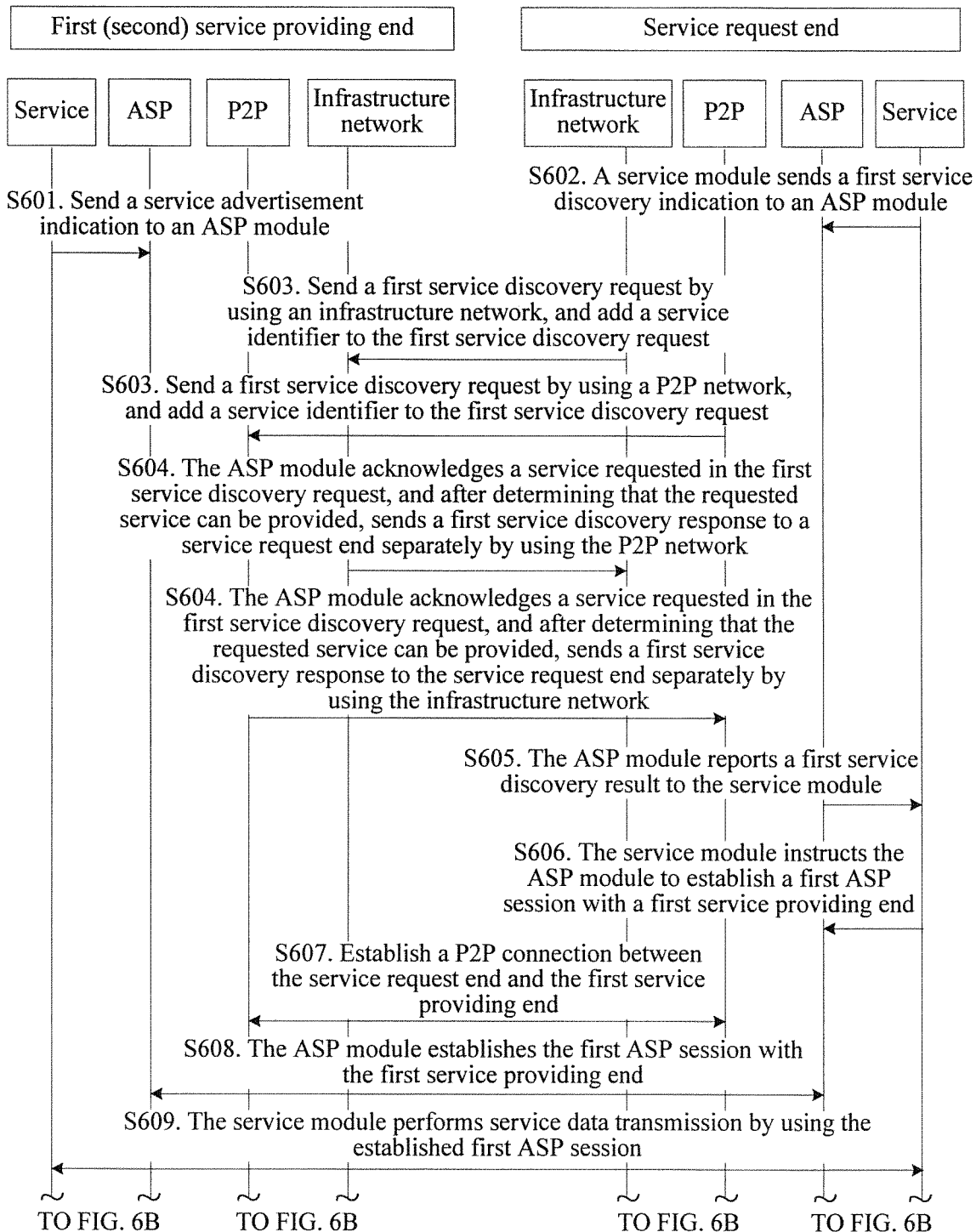
FIG. 6A and FIG. 6B are a first flowchart of a service discovery method applied to a service request end according to Embodiment 1 of the present disclosure.
Figure 6B:
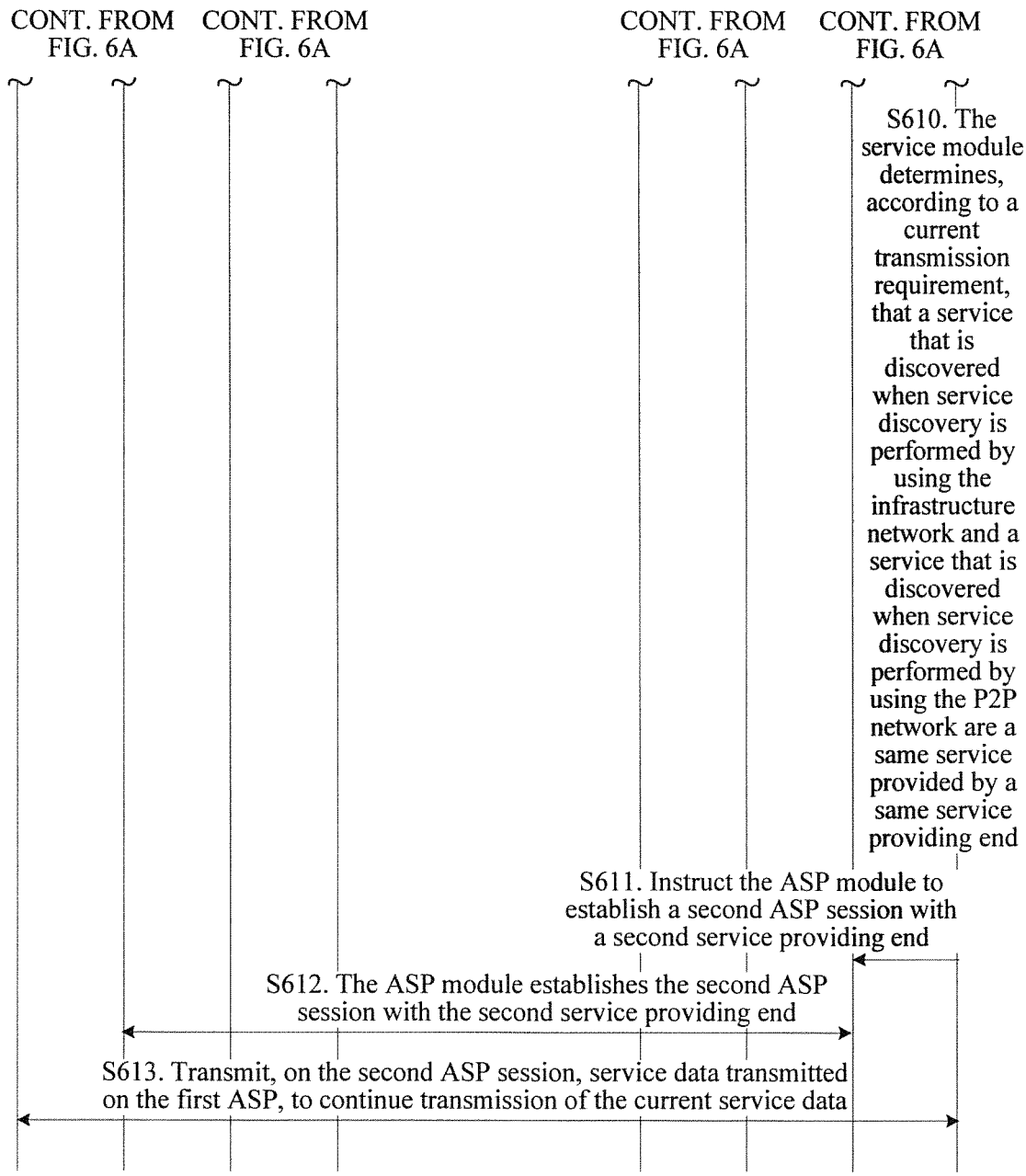

Using a Wi-Fi network to which a service request end (a terminal) connects as an example, assuming that the service request end connects to a P2P network and an infrastructure network (an AP-based network), the service request end needs to display, by using a screen of a service providing end (a television), screen content of the service request end. Specifically, as shown in FIG. 6A and FIG. 6B, the service discovery method includes the following steps:

S601: A service module of the first service providing end sends a service advertisement indication to an ASP module of the first service providing end, so that when the service request end sends a service discovery request, the service providing end can process the service discovery request.

In this step, it is assumed that the service module of the television sends a service advertise AdvertiseService (a service name ServiceName) message to an ASP module of the television, where the ServiceName may be a service name of a service provided by the service providing end, for example, a name of a discovered display (Display) service. Further, the service advertisement indication may carry identifier information, that is, identifier information indicating the television device.

S602: A service module of the service request end sends a first service discovery indication to an ASP module of the service request end.

For example, a service module of the terminal sends a first service discovery SeekService (service name Service Name) indication to an ASP module of the terminal. The ServiceName may be a name of a Display service.

S603: The ASP module of the service request end sends a first service discovery request according to the first service discovery indication received in S602 and by using a P2P network and an infrastructure network, and adds a service identifier to the first service discovery request.

For example, the ASP module of the terminal sends, separately by using the P2P network and the infrastructure network, the first service discovery request used to discover a Display service, and adds the name of the Display service to the first service discovery request.

Further, in this step, the first service discovery request may be broadcast by using the P2P network and the infrastructure network, so that the service providing end that can provide a service responds to the first service discovery request.

S604: After the service providing end separately receives the first service discovery request by using the P2P network and the infrastructure network in the device, the ASP module of the service providing end acknowledges a service requested in the first service discovery request, and after determining that the requested service can be provided, sends a first service discovery response to the service request end separately by using the P2P network and the infrastructure network.

The first service discovery response may carry the identifier information, and further, may carry a service name.

Further, the premise under which the service discovery can be performed successfully by using the infrastructure network is: the service providing end and the service request end both establish connections to a same AP, or the service providing end and the service request end connect to different APs but the two different APs may communicate with each other.

Further, step S603 and step S604 may use different implementation manners for the P2P network and the infrastructure network.

Specific implementation for the P2P network may be:

Step 1: The ASP module of the service request end sends, by using the P2P network, a Probe Request message carrying a service hash value (ServiceHash).

Step 2: The service providing end receives the Probe Request message by using the P2P network, acknowledges, by using the ASP module of the service providing end, the ServiceHash carried in the Probe Request message, and when determining that the service represented by the ServiceHash can be provided, sends a probe Response message to the service request end by using the P2P network.

In this step, the Probe Response message may carry a ServiceName corresponding to the ServiceHash.

Step 3: After receiving the Probe Response message by using the P2P network, the service request end sends a service discovery request Service Discovery Request carrying the ServiceName to the service providing end by using the P2P network.

Step 4: After receiving the Service Request message by using the P2P network, the service providing end performs, by using the ASP module of the service providing end, matching on the ServiceName carried in the Service Discovery Request, and when determining that the service represented by the ServiceName can be provided, sends a Service Discovery Response message carrying the ServiceName to the service request end by using the P2P network.

Further, in step 2 and step 4, the Probe Response message and/or Service Discovery Response message may carry the identifier information (ServiceID) of the service providing end, or may include network information of the service providing end (the network information of the service providing end may be network address information or other information that can describe the network), or may include service description information of the service providing end.

Specific implementation for the infrastructure network may be:

Step 1: The service request end sends, by using the infrastructure network, a service discovery request Service Discovery Request carrying a Servicename.

Step 2: After receiving the Service Request message by using the infrastructure network, the service providing end performs, by using the ASP module of the service providing end, matching on the ServiceName carried in the Service Discovery Request, and when determining that the service represented by the ServiceName can be provided, sends a Service Discovery Response message carrying the ServiceName to the service request end by using the infrastructure network.

Further, in step 2, the Service Discovery Response message may carry the identifier information (ServiceID) of the service providing end, or may include network information identifying the service providing end (the network information of the service providing end may be network address information or other information that can describe the network), or may include service description information of the service providing end.

Further, the implementation manner for the P2P network may be used for the infrastructure network, and details are not described herein again.

S605: The ASP module of the service request end reports, to the service module of the service request end, a first service discovery result that is determined according to the first service discovery response separately received by using the P2P network and the infrastructure network.

In this step, the ASP module may report network address information (or the information is not included) corresponding to the P2P network, information about a service providing end discovered by using the P2P network, and a ServiceID received by using the P2P network, and report network address information (or the information is not included) of the infrastructure network on which the same service discovery completed the P2P network is completed, information about a service providing end discovered by using the infrastructure network, and the ServiceID received by using the infrastructure network. In addition, when reporting the service discovery result for each network, the ASP module may report the network information of the network completing service discovery, information about the service providing end discovered by using the network, and the received ServiceID of the service providing end to the service module by using one message, or may respectively report the network information, the information about the service providing end discovered by using the network, and the received ServiceID to the service module by using different messages, where a sequence of sending the different messages is not limited.

S606: The service module of the service request end instructs the ASP module of the service request end to establish a first ASP session with a first service providing end.

The service module determines the first service providing end from the service providing end discovered by using the P2P network and the service providing end discovered by using the infrastructure network.

Figure 7A:
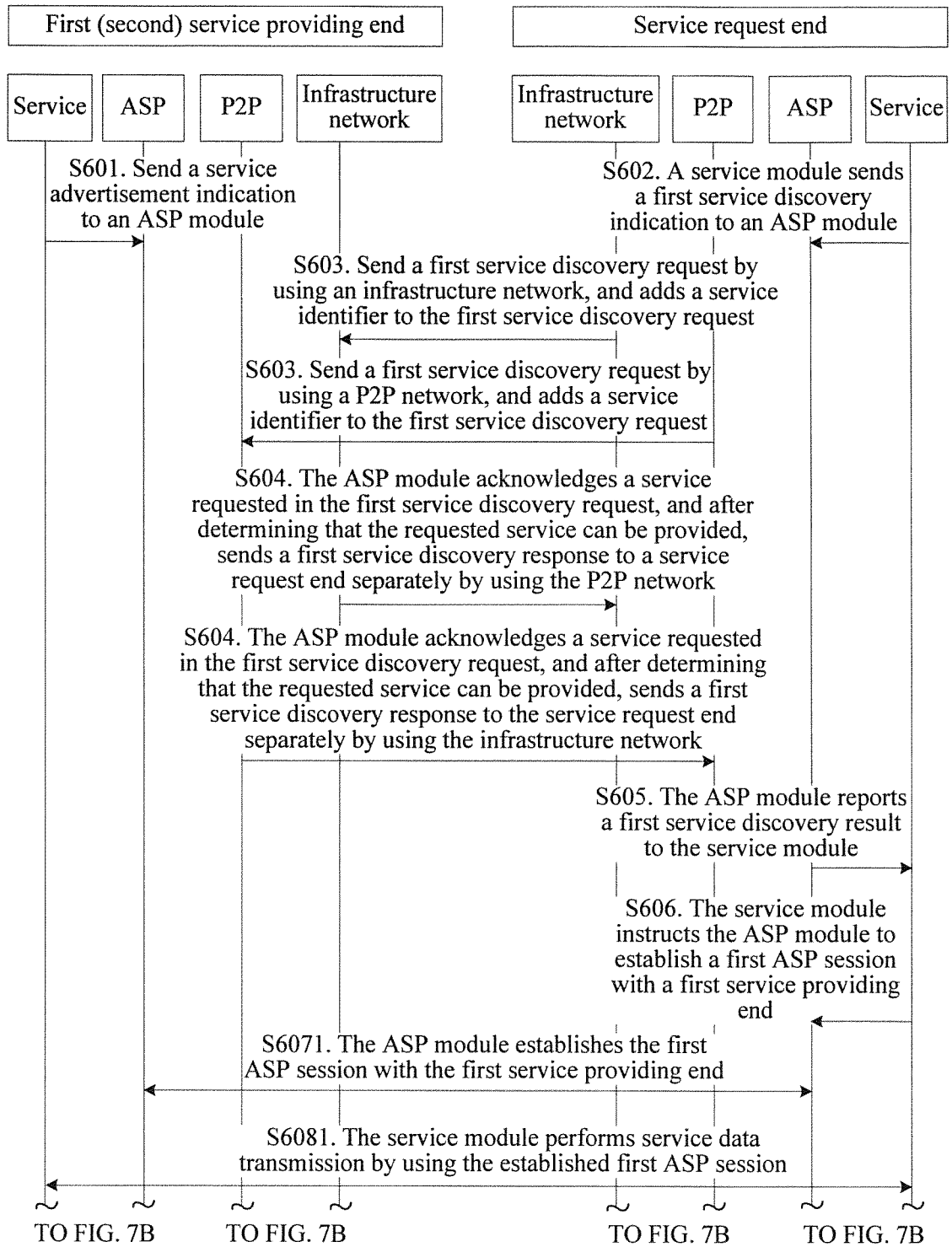
FIG. 7A and FIG. 7B are a second flowchart of a service discovery method applied to a service request end according to Embodiment 1 of the present disclosure.
Figure 7B:
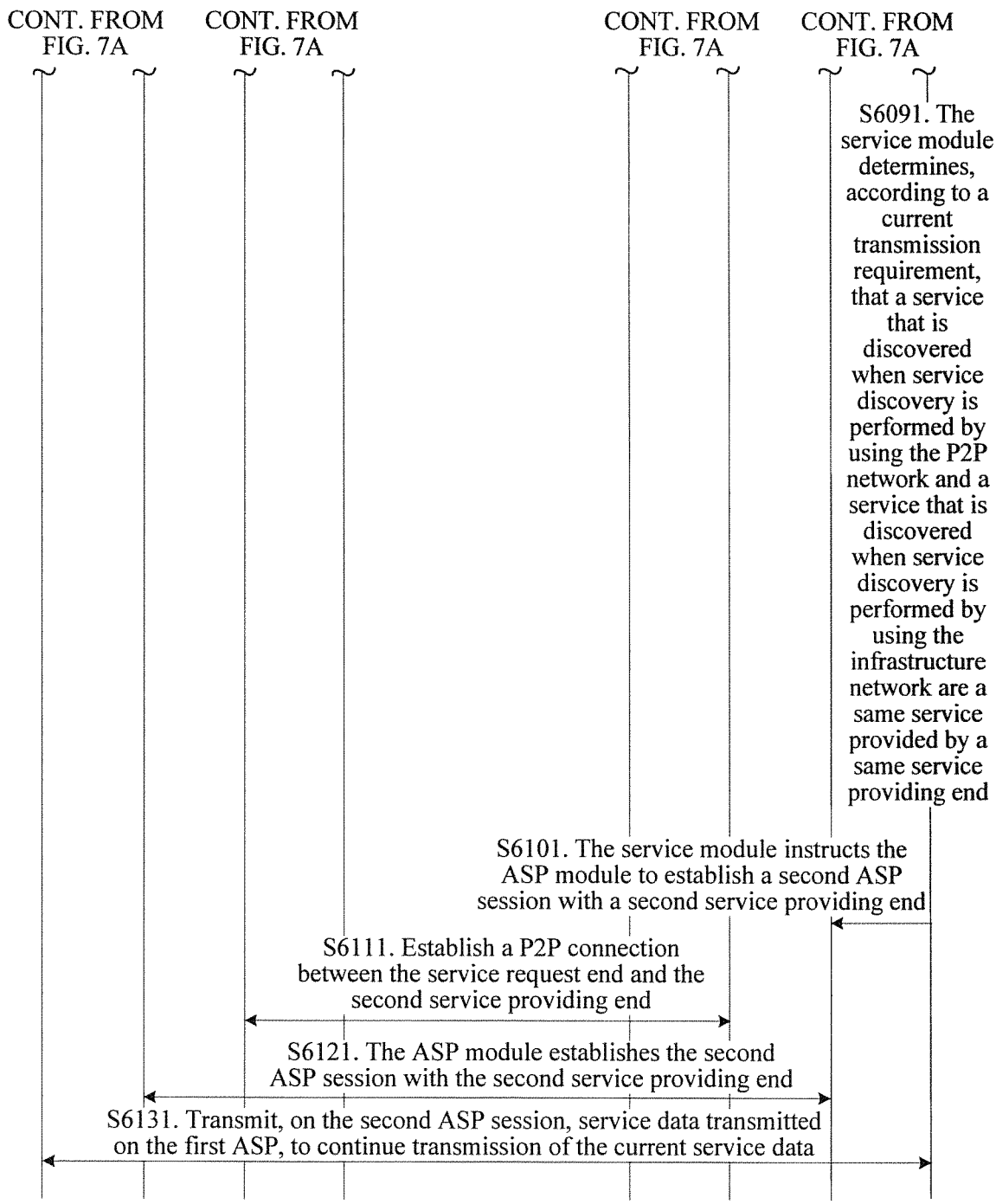

Assuming that the first network determined by the service module is the P2P network and the service providing end discovered by using the P2P network is the first service providing end, subsequent step S607 to step S612 are performed. Assuming that the first network determined by the service module is the infrastructure network and the service providing end discovered by using the infrastructure network is the first service providing end, as shown in FIG. 7A and FIG. 7B, subsequent steps S6071 to S6111 are performed.

S607: Establish a P2P connection between the service request end and the first service providing end.

Further, because after service discovery is performed on the P2P network, a P2P connection needs to be established first and an ASP session is established based on the established P2P connection, the creating an ASP session based on the P2P network may be: creating a P2P connection between the service request end and the service providing end; and creating an ASP session based on the established P2P connection.

S608: The ASP module of the service request end establishes the first ASP session with the first service providing end.

S609: The service module of the service request end performs service data transmission by using the first ASP session established in S608.

Further, a process of the step specifically includes: creating, by the service module, an upper layer service session based on the established first ASP session, where the upper layer service session is established by using the first network, and data of the upper layer service is transmitted by using the first network.

For example, in this step, the service module of the terminal establishes an upper layer Display service session based on the first ASP session established between the P2P network and the television, to perform service data transmission of a Display service, and displays, by using the television, the content displayed on the terminal screen.

S610: The service module of the service request end determines, according to a current transmission requirement, whether identifier information of a service providing end that is received when service discovery is performed for a same service by using the infrastructure network matches identifier information of a service providing end that is received when service discovery is performed by using the P2P network, and if the identifier information matches, determines that a service that is discovered when service discovery is performed by using the infrastructure network and a service that is discovered when service discovery is performed by using the P2P network are a same service provided by a same service providing end.

In this step, when a distance between the service request end and the service providing end is increasingly large, signal quality of the P2P network becomes weaker, and the service request end replaces the P2P network with the infrastructure network to continue a current service.

S611: The service module instructs the ASP module to establish a second ASP session with a second service providing end, where the service module of the service request end determines that the service providing end discovered by using the infrastructure network is the second service providing end discovered by using a second network.

Further, the step of creating the first ASP session in step S608 is similar to the step of creating the second ASP session in this step. A difference between the two steps lies in that: when the second ASP session is established based on the infrastructure network, requests and responses exchanged between the service request end and the service providing end need to be forwarded by using an AP.

S612: The ASP module establishes the second ASP session with the second service providing end.

S613: Transmit, on the second ASP session, service data transmitted on the first ASP established based on the P2P network, to continue transmission of the current service data. The process ends.

Further, this step specifically includes: creating, by the service module, an upper-layer service session based on the established second ASP session, and transferring a service session previously performed on the first ASP session to the second ASP service session to continue transmission, that is, transferring data transmission on the service session on the first ASP session to the service session on the second ASP session to continue transmission.

For example, the terminals use, by using the P2P network, a Display service provided by the television. Because a distance between the terminal and the television becomes large, the service module of the terminal determines that a signal of the P2P network is weaker. If a Display service discovered by using the infrastructure network is a same Display service provided by a same television, video transmission between the terminal and the television does not need to be interrupted, an ASP session is established based on the infrastructure network, and the P2P network based on which video data is transmitted between the terminal and the television is switched to the infrastructure network, to continue video data transmission between the terminal and the television.

As shown in FIG. 7A and FIG. 7B, continued from step S606:

S6071: The ASP module of the service request end establishes the first ASP session with the first service providing end.

S6081: The service module of the service request end performs service data transmission by using the first ASP session established in S6071.

Further, the step specifically includes: creating, by the service module, an upper layer service session based on the established first ASP session, where the upper layer service session is established by using the first network, and data of the upper layer, service is transmitted by using the first network.

S6091: The service module of the service request end determines, according to a current transmission requirement, whether identifier information of a service providing end that is received when service discovery is performed for a same service by using the P2P network matches identifier information of a service providing end that is received when service discovery is performed by using the infrastructure network, and if the identifier information matches, determines that a service that is discovered when service discovery is performed by using the P2P network and a service that is discovered when service discovery is performed by using the infrastructure network are a same service provided by a same service providing end.

S6101: The service module of the service request end instructs the ASP module to establish a second ASP session with a second service providing end, where the service module of the service request end determines that the service providing end discovered by using the P2P network is the second service providing end discovered by using a second network.

S6111: Establish a P2P connection between the service request end and the second service providing end.

S6121: The ASP module of the service request end establishes the second ASP session with the second service providing end.

S6131: Transmit, on the second ASP session, service data transmitted on the first ASP established based on the infrastructure network, to continue transmission of the current service data. The process ends.

Further, this step specifically includes: creating, by the service module, an upper layer service session based on the established second ASP session, and transferring a service session previously performed on the first ASP session to the second ASP service session to continue transmission, that is, transferring data transmission on the service session on the first ASP session to the service session on the second ASP session to continue transmission.

Embodiment 2

In Embodiment 2 of the present disclosure, using an ASP as an example, a service discovery method is provided, applied to a service request end side. In Embodiment 2, first, a first ASP session may be established based on a first network, service data is transmitted on the first ASP session, and when the first network cannot satisfy a service requirement, service discovery is performed again, and an ASP session is established based on a second network, where a service discovered by using the second network during the second service discovery and a service discovered by using the first network are a same service provided by a same service providing end, and transmission of the current service data is continued by using the second ASP session.

Figure 8:
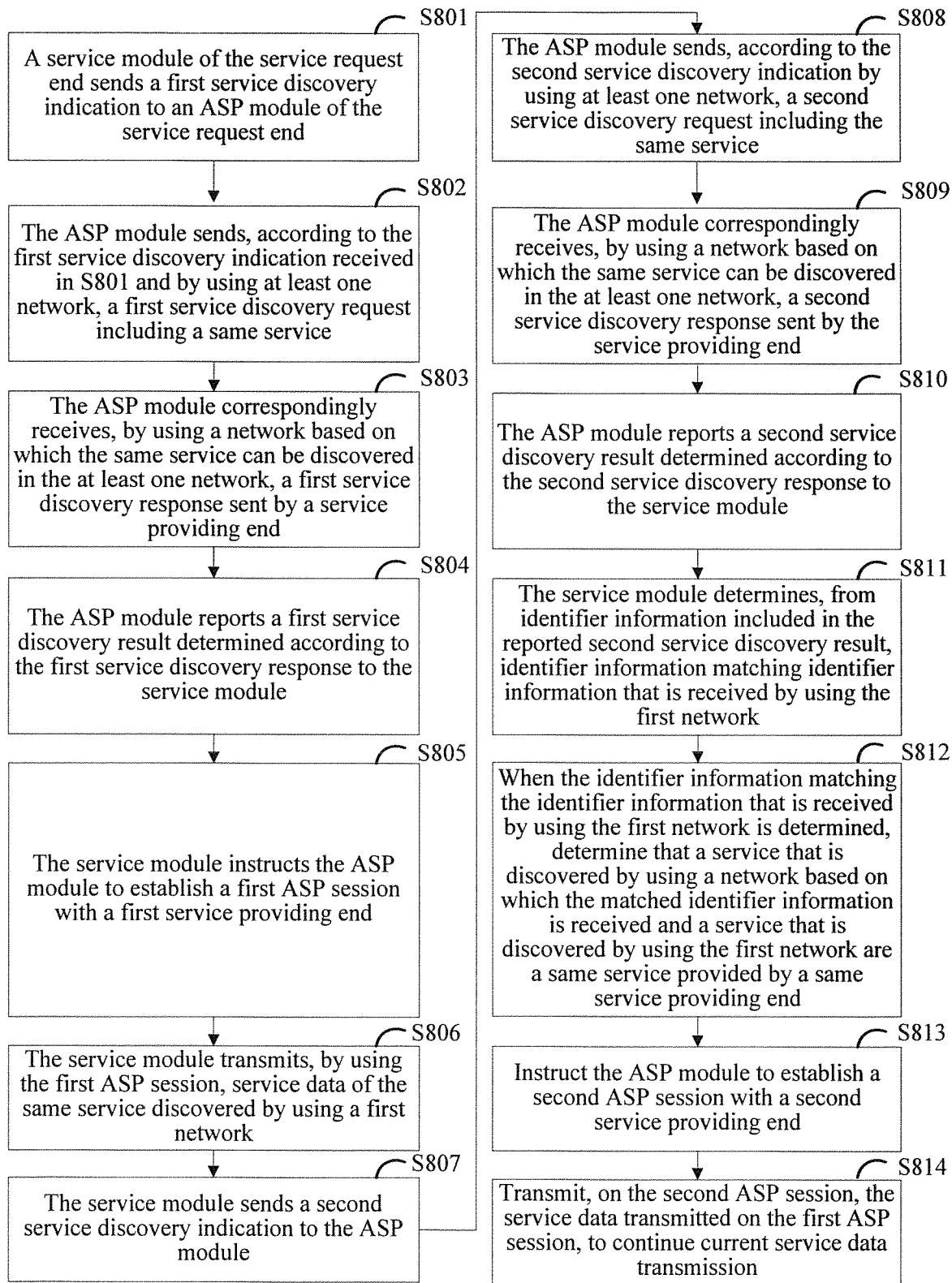
FIG. 8 is a flowchart of a service discovery method applied to a service request end according to Embodiment 2 of the present disclosure.

The service discovery method provided in Embodiment 2 is applied to the service request end. As shown in FIG. 8, the method specifically includes the following steps:

S801: A service module of the service request end sends a first service discovery indication to an ASP module of the service request end.

S802: The ASP module sends, according to the first service discovery indication received in S801 and by using at least one network, a first service discovery request including a same service.

The first service discovery request carries a service identifier of the same service.

Further, in this step, the first service discovery request including the same service may be sent by using one network or multiple different networks.

S803: The ASP module correspondingly and separately receives, by using a network based on which the same service can be discovered in the at least one network, a first service discovery response sent by a service providing end.

The first service discovery response carries the identifier information.

Further, in this step, the identifier information may identify the service providing end sending the first service discovery response. For example, device information (for example, a device name, a device type, or a sequence number of a device) of the service providing end sending the first service discovery response may be used as the identifier information of the service providing end, or a unique device address of the service providing end, service identifier information related to the device, a combination of multiple pieces of the foregoing information (for example, the device address of the service providing end and the service information), or other information that can identify the service providing end may be used as the identifier information of the service providing end.

Further, in this step, the first service discovery request including the same service is sent by using one network in S802 and when the same service can be discovered by using the network, the first service discovery response sent by using the network is received.

Further, step S801 to step S803 are a process of the first service discovery for the same service.

S804: The ASP module reports a first service discovery result determined according to the first service discovery response to the service module.

The first service discovery result includes network information of the network by using which the same service can be discovered, and information about a service providing end discovered by using the network based on which the same service can be discovered; or the first service discovery result includes information about a service providing end discovered by using the network based on which the same service can be discovered;

Further, in this step, the ASP module reports the first service discovery result obtained during the first service discovery to the service module.

Further, the first service discovery result may be determined according to the first service discovery response. The first service discovery result may include the network information of the network by using which the same service is discovered, or may not include the network information. The information about the service providing end may be network address information of the service providing end, and/or service description information of the service provided by the service providing end, or the like, and the network information may include property information, type information, or the like describing the network by using which the service providing end is discovered, for example, a P2P network, an AP network, address information, and/or other information that can describe the network.

S805: The service module instructs the ASP module to establish a first ASP session with a first service providing end.

The first service providing end is determined by the service module from the reported first service discovery result, and the first service providing end is discovered by using a first network.

S806: The service module transmits, by using the first ASP session established in S805, service data of the same service discovered by using a first network.

Further, the step specifically includes: creating, by the service module, an upper layer service session based on the established first ASP session, where the upper layer service session is established by using the first network, and data of the upper layer service is transmitted by using the first network.

S807: The service module sends a second service discovery indication to the ASP module.

Further, this step may be performed according to the current service transmission requirement. The current service transmission requirement may be set according to an actual case. For example, when a signal of the first network becomes weak, and cannot satisfy the current service transmission requirement, this step may be performed, or when service data currently needing to be transmitted increases, and a first network bandwidth is insufficient and cannot satisfy the current service transmission requirement, this step may be performed.

Further, in this embodiment, although the ASP module reports the first service discovery result obtained during the first service discovery to the service module in step S804, and the first service discovery result includes the information about the service providing end discovered by using the network based on which the same service can be discovered, that is, the service module may determine the second network from a network during the first service discovery except the first network, where a service discovered by using the network and a service discovered by using the first network are the same service provided by the same service providing end, because a time of using the first ASP session is relatively long and accuracy of a result of the first service discovery may decrease currently, in this embodiment, the service module needs to initiate the second service discovery, and determine the second network from a network during the second service discovery, where a service discovered by using the network and the service discovered by using the first network are the same service provided by the same service providing end.

S808: The ASP module sends, according to the second service discovery indication in S807 by using at least one network, a second service discovery request including the same service.

The second service discovery request carries a service identifier of the same service, and the preset network includes a network in the different networks.

Further, in this embodiment, the at least one network based on which the first service discovery is preformed and the at least one network based on which the second service discovery is performed may be at least one network of the following different types of networks: a wired network, an infrastructure network, a P2P network, a Bluetooth network, an NFC network, an LTE network, or a Powerline network. In addition, the at least one network based on which the first service discovery is preformed and the at least one network based on which the second service discovery is performed may be the same or may be different.

Further, in this step, the second service discovery request represents a request used to perform service discovery by using a network, and any message that can be used to perform service discovery by using a network can be used as the second service discovery request in this embodiment of the present disclosure.

S809: The ASP module correspondingly and separately receives, by using the network based on which the same service can be discovered in the at least one network, a second service discovery response sent by the service providing end.

The second service discovery response carries the identifier information.

Further, in this step, for the network by using which the same service can be discovered in the at least one network, the ASP module receives, by using the network, the second service discovery response sent by the service providing end that is discovered by using the network and that provides the same service.

Further, in this step, the identifier information may identify the service providing end sending the second service discovery response. For example, device information (for example, a device name, a device type, or a sequence number of a device) of the service providing end sending the second service discovery response may be used as the identifier information of the service providing end, or a unique device address of the service providing end, service identifier information related to the device, a combination of multiple pieces of the foregoing information (for example, the device address of the service providing end and the service information), or other information that can identify the service providing end may be used as the identifier information of the service providing end.

Further, during specific implementation, the second service discovery request may be a probe request (Probe Request), or a Service Discovery Request, or a Probe Request and a Service Discovery Request. That is, for each network in the preset network, when the second service discovery request is a Probe Request, a same service identifier (for example, a service hash value) may be carried in the Probe Request sent by using the network, and the second service discovery response received by using the network correspondingly may be a probe response (Probe Response), and the identifier information is carried in the Probe Response; when the second service discovery request is a Service Discovery Request, a same service identifier (for example, a service name) may be carried in the Service Discovery Request sent by using the network, the second service discovery response received by using the network correspondingly may be a Service Discovery Response, and the identifier information is carried in the Service Discovery Response; or when the second service discovery request is a Probe Request and a Service Discovery Request, the Probe Request may be sent first, a service identifier (for example, a service hash value) is carried in the Probe Request, and a corresponding Probe Response is received by using the network, and then, the Service Discovery Request is sent, a service identifier (for example, a service name) is carried in the Service Discovery Request, a Service Discovery Response is received by using the network, and the identifier information may be carried in the Probe Response and/or the Service Discovery Response. Specific implementation may be set according to actual cases.

Further, correspondingly, the second service discovery response is used to respond to the request (which is referred to as the second service discovery request in this embodiment of the present disclosure) of performing service discovery by using a network, and any response that is used to respond to the request that is of performing service discovery by using the network may be used as the second service discovery response in this embodiment of the present disclosure.

Further, step S807 to step S809 are a process of the second service discovery for the same service.

S810: The ASP module reports a second service discovery result determined according to the second service discovery response to the service module.

The second service discovery result includes network information of each network based on which the same service can be discovered and that is determined according to the received second service discovery response, information about a service providing end discovered by using each network based on which the same service can be discovered, and identifier information received by using each network based on which the same service can be discovered; or the second service discovery result includes information about a service providing end that is determined according to the received second service discovery response and that is discovered by using each network based on which the same service can be discovered, and identifier information received by using each network based on which the same service can be discovered.

Further, the second service discovery result may be determined according to the second service discovery response. The second service discovery result may include the network information of the network by using which the same service is discovered, or may not include the network information. The information about the service providing end may be network address information of the service providing end, and/or service description information of the service provided by the service providing end, or the like, and the network information may include property information, type information, or the like describing the network by using which the service providing end is discovered, for example, a P2P network, an AP network, address information, and/or other information that can describe the network.

Further, in this step, after receiving the second service discovery response sent by using at least one network on which service discovery is completed, the ASP module may report the second service discovery result obtained after the service discovery is performed for the same service to the service module.

Further, the network information corresponding to the network based on which the same service can be discovered, information about a discovered communication providing end, and identifier information that is received by using the network may be reported by using one message or different messages. Multiple service providing ends that can provide the same service may be discovered by using one network.

S811: The service module determines, from identifier information included in the reported second service discovery result, identifier information matching identifier information that is received by using the first network.

S812: When the identifier information matching the identifier information that is received by using the first network is determined, determine that a service that is discovered by using a network based on which the matched identifier information is received and a service that is discovered by using the first network are a same service provided by a same service providing end.

S813: Instruct the ASP module to establish a second ASP session with a second service providing end.

The second service providing end is determined by the service module from service providing ends discovered by using the network based on which the matched identifier information is received, and the second providing end is discovered by using a second network.

Further, in this step, when there is only one network based on which the matched identifier information is received in the second service discovery result, it is determined that the network is the second network. When there are at least two networks based on which the matched identifier information is received in the second service discovery result, the second network is determined according to a preset determining rule. The preset determining rule may be signal quality of the network, a sequence in which service discovery is completed on the networks, or the like. An upper layer service selects one according to the information, or an upper layer service selects one from multiple networks and corresponding service providing ends according to information about a previous connection, or an upper layer service selects a service providing end according to other obtained information. The preset determining rule used to determine the first network may be the same as or may be different from the preset determining rule used to determine the second network.

Further, the first service providing end determined in step S805 and the second service providing end determined in this step are the same service providing end providing the same service.

S814: Transmit, on the second ASP session, the service data transmitted on the first ASP session, to continue current service data transmission.

Further, this step specifically includes: creating, by the service module, an upper layer service session based on the established second ASP session, and transferring a service session previously performed on the first ASP session to the second ASP service session to continue transmission, that is, transferring data transmission on the service session on the first ASP session to the service session on the second ASP session to continue transmission.

Further, for explanations of similar steps in Embodiment 2 and Embodiment 1, refer to corresponding steps in Embodiment 1, and details are not described herein again.

The following describes, by using a specific application scenario exemplarily, the service discovery method provided in Embodiment 2.

Example 2

Figure 9A:
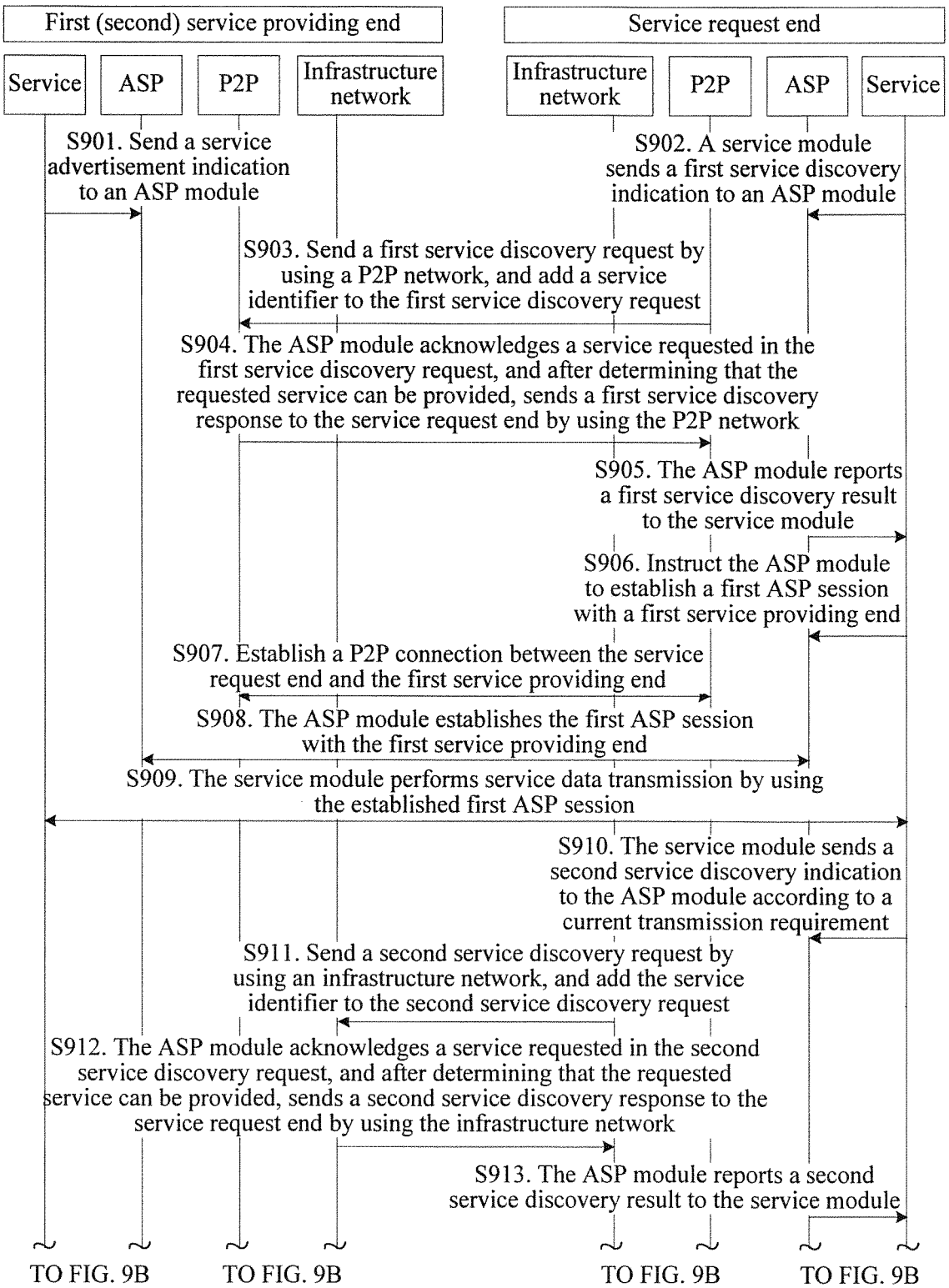
FIG. 9A and FIG. 9B are a flowchart of a service discovery method applied to a service request end according to Embodiment 2 of the present disclosure.
Figure 9B:
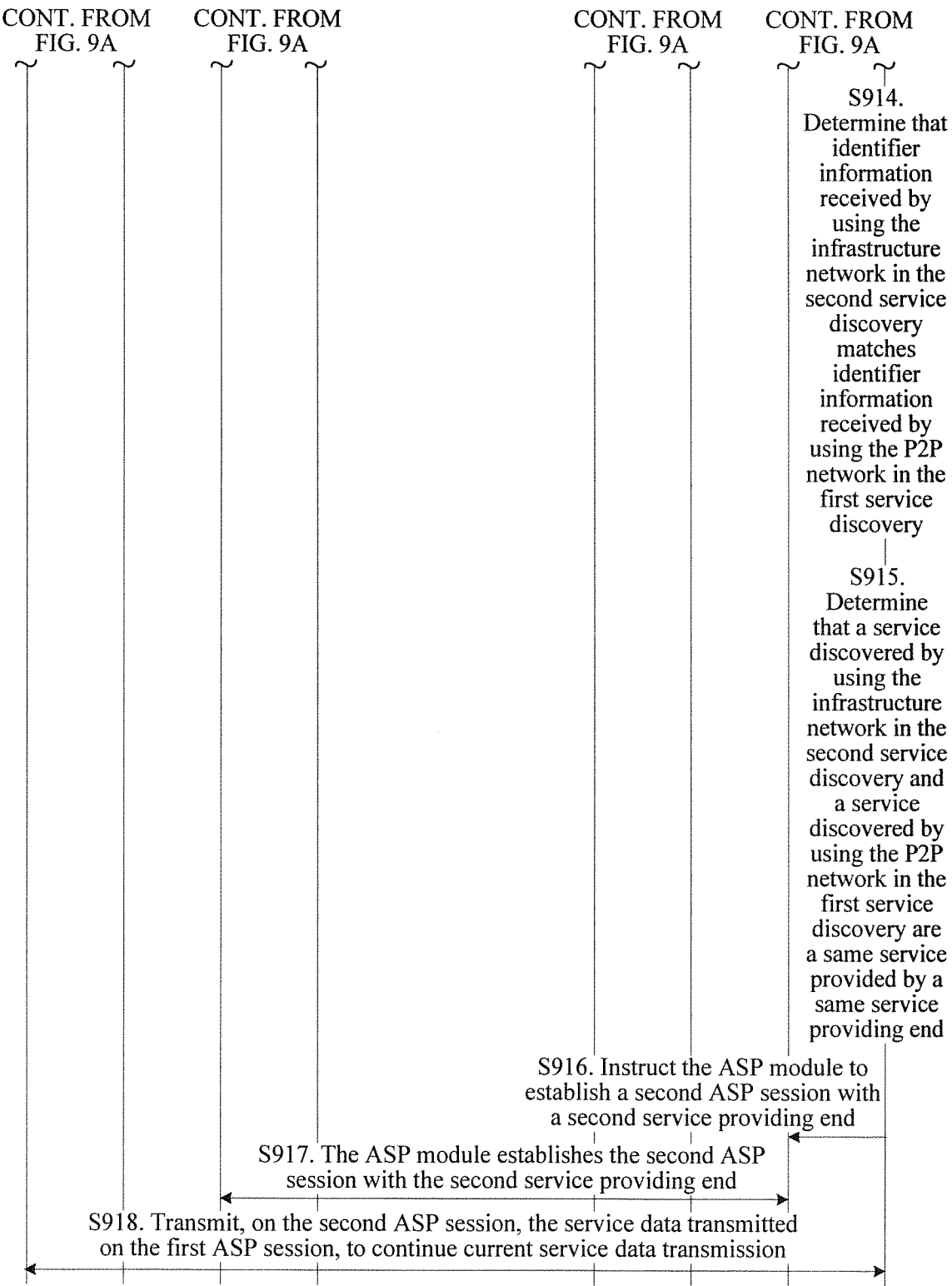

Using a Wi-Fi network to which a service request end (a terminal) connects as an example, assuming that the service request end connects to a P2P network and an infrastructure network, the service request end needs to display, by using a screen of a service providing end (a television), screen content of the service request end. In addition, in example 2, it is assumed that the first service discovery is performed by using the P2P network and the second service discovery is performed by using the infrastructure network. Specifically, as shown in FIG. 9A and FIG. 9B, the service discovery method includes the following steps:

S901: A service module of the service providing end sends a service advertisement indication to an ASP module of the service providing end, so that when the service request end sends a service discovery request, the service providing end can process the service discovery request.

S902: A service module of the service request end sends a first service discovery indication to an ASP module of the service request end.

S903: The ASP module of the service request end sends a first service discovery request according to the first service discovery indication received in S902 and by using the P2P network, and adds a service identifier to the first service discovery request.

In this step, the ASP module of the service request end may send the first service discovery request according to the first service discovery indication received in S902 and by using the P2P network and the infrastructure network, and add the service identifier to the first service discovery request.

S904: After the service providing end receives the first service discovery request by using the P2P network, the ASP module of the service providing end acknowledges a service requested in the first service discovery request, and after determining that the requested service can be provided, sends a first service discovery response to the service request end by using the P2P network.

The first service discovery response may carry identifier information, and further, may carry a service name.

S905: The ASP module of the service request end reports a first service discovery result obtained after the service discovery is performed by using the P2P network to the service module of the service request end.

In this step, the ASP module may report network address information corresponding to the P2P network, information about a service providing end discovered by using the P2P network, and a ServiceID received by using the P2P network to the service module.

S906: The service module of the service request end instructs the ASP module of the service request end to establish a first ASP session with a first service providing end.

The service module determines that the service providing end discovered by using the P2P network is the first service providing end.

Further, when the first service discovery request is sent by using the P2P network and the infrastructure network in step S903, this step may be: determining, by the service module, the first service providing end from the service providing end discovered by using the P2P network and the service providing end discovered by using the infrastructure network.

S907: Establish a P2P connection between the service request end and the first service providing end.

S908: The ASP module of the service request end establishes the first ASP session with the first service providing end.

S909: The service module of the service request end performs service data transmission by using the first ASP session established in S908.

Further, a process of the step specifically includes: creating, by the service module, an upper layer service session based on the established first ASP session, where the upper layer service session is established by using a first network, and data of the upper layer service is transmitted by using the first network.

S910: The service module of the service request end sends a second service discovery indication to the ASP module of the service request end according to a current transmission requirement.

Further, in this step, the service discovered according to indication of the second service discovery indication and the service discovered according to indication of the first service discovery indication are a same service.

In this step, when a distance between the service request end and the service providing end is increasingly large, signal quality of the P2P network becomes weaker, and the service request end replaces the P2P network with the infrastructure network to continue a current service.

S911: The ASP module of the service request end sends a second service discovery request according to the second service discovery indication received in S910 and by using the infrastructure network, and adds the service identifier to the second service discovery request.

Further, in this step, the second service discovery request may be broadcast by using the infrastructure network, so that the service providing end that can provide a service responds to the first service discovery request.

S912: After the service providing end receives the second service discovery request by using the infrastructure network, the ASP module of the service providing end acknowledges a service requested in the second service discovery request, and after determining that the requested service can be provided, sends a second service discovery response to the service request end by using the infrastructure network.

The second service discovery response may carry the identifier information, and further, may carry the service name.

Further, for the P2P network and the infrastructure network, different implementation manners may be used to perform service discovery, and details are not described herein again.

S913: The ASP module of the service request end reports a second service discovery result obtained after the service discovery is performed by using the infrastructure network to the service module of the service request end.

In this step, the ASP module may report network address information corresponding to the infrastructure network (or the information is not included), information about a service providing end discovered by using the infrastructure network, and a ServiceID received by using the infrastructure network to the service module.

S914: The service module determines that identifier information received by using the infrastructure network during the second service discovery matches identifier information received by using the P2P network during the first service discovery.

S915: Determine that a service discovered by using the infrastructure network during the second service discovery and a service discovered by using the P2P network during the first service discovery are a same service provided by a same service providing end.

S916: The service module of the service request end instructs the ASP module of the service request end to establish a second ASP session with a second service providing end.

The service module determines that the service providing end discovered by using the infrastructure network during the second service discovery is the second service providing end discovered by using a second network.

S917: The ASP module of the service request end establishes the second ASP session with the second service providing end.

S918: The service module of the service request end transmits, on the second ASP session, the service data transmitted on the first ASP session, to continue current service data transmission.

Embodiment 3

In Embodiment 3 of the present disclosure, using an ASP as an example, a service discovery method is provided, applied to a service request end side. In Embodiment 3, first, ASP sessions may be separately established based on networks, where services discovered by using the networks are a same service provided by a same service providing end, service data is transmitted on a first ASP session established based on a first network, and when the first network cannot satisfy a service requirement, a second ASP session is used to continue transmission of the current service data.

Figure 10:
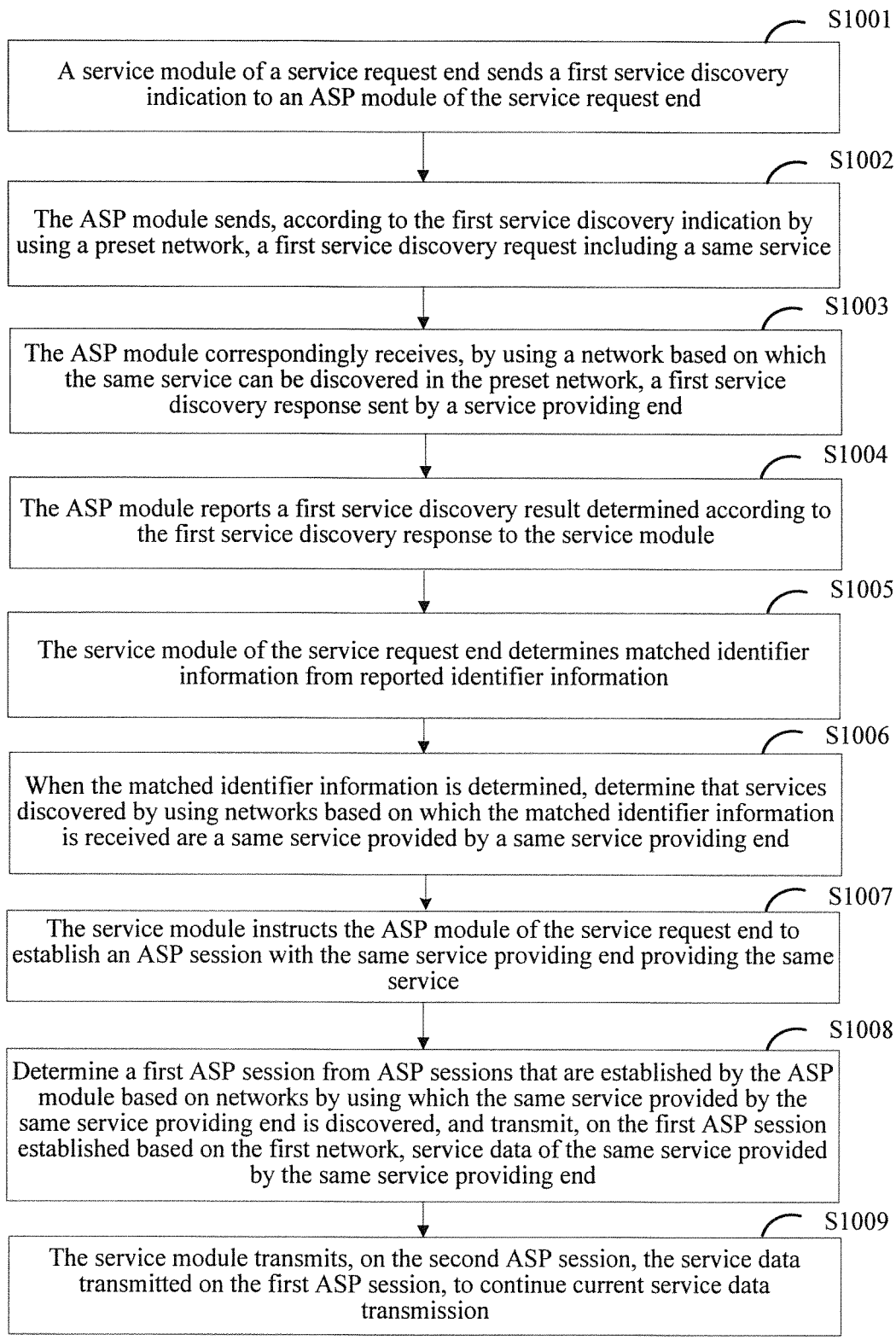
FIG. 10 is a flowchart of a service discovery method applied to a service providing end according to Embodiment 3 of the present disclosure.

The service discovery method provided in Embodiment 3 is applied to the service request end. As shown in FIG. 10, the method specifically includes the following steps:

S1001: A service module of the service request end sends a first service discovery indication to an ASP module of the service request end.

S1002: The ASP module sends, according to the first service discovery indication received in S1001 and by using a preset network, a first service discovery request including a same service.

The first service discovery request carries a service identifier of the same service, and the preset network includes a network in different networks.

Further, in this step, the service request end may connect to multiple different networks (for example, at least two different networks of the following different types of networks: a wired network, an infrastructure network, a P2P network, a Bluetooth network, an NFC network, an LTE network, or a Powerline network). When the ASP module receives the first service discovery indication sent by the service module, the ASP module may perform service discovery for the same service by using a preset network and according to a service (for example, a printing service) discovered according to a requirement of the first service discovery indication, where for explanations of the preset network and the service identifier, refer to Embodiment 1, and details are not described herein again.

Further, when the service request end device supports only two different networks, the preset network is the two different networks.

S1003: The ASP module correspondingly and separately receives, by using a network based on which the same service can be discovered in the preset network, a first service discovery response sent by a service providing end.

The first service discovery response carries identifier information.

Further, step S1001 to step S1003 are a process of service discovery for the same service.

S1004: The ASP module reports a first service discovery result determined according to the first service discovery response to the service module.

Further, the first service discovery result may be determined according to the first service discovery response. The first service discovery result includes network information of each network based on which the same service can be discovered, information about a service providing end discovered by using each network based on which the same service can be discovered, and identifier information received by using each network based on which the same service can be discovered; or the first service discovery result includes information about a service providing end discovered by using each network based on which the same service can be discovered, and identifier information received by using each network based on which the same service can be discovered.

Further, in this step, after receiving the first service discovery response sent by using at least two networks on which service discovery is completed, the ASP module may report the first service discovery result obtained after the service discovery is performed for the same service to the service module. Further, the first service discovery result may include network information (or the network information may not be included) of networks based on which the same service is discovered. The information about the service providing end may be network address information of the service providing end, and/or service description information of the service provided by the service providing end, or the like, and the network information may be property information, type information, or the like describing the network by using which the service providing end is discovered, for example, a P2P network, an AP network, address information, or other information that can describe the network. Further, the first service discovery result may include identifier information carried in a service discovery response that is received by using the network based on which the same service can be discovered, so that the service module can determine, according to the identifier information corresponding to different networks, whether services discovered by using different networks are the same service provided by the same service providing end.

S1005: The service module of the service request end determines matched identifier information from reported identifier information.

Further, although service discovery is performed for the same service by using different networks, different service providing ends may provide a same service, and the first service discovery response received by using different networks carries identifier information, which may be used to identify a service providing end providing a service. In this step, the service module of the service request end determines, according to whether identifier information received when service discovery for the same service is performed by using different networks matches, whether the services discovered by using different networks are the same service provided by the same service providing end.

S1006: When the matched identifier information is determined, determine that services discovered by using networks based on which the matched identifier information is received are a same service provided by a same service providing end.

In this step, the service module of the service request end determines that services discovered by using the networks based on which the matched identifier information is received are the same service provided by the same service providing end.

S1007: The service module instructs the ASP module of the service request end to establish an ASP session with the same service providing end providing the same service.

Further, in this step, the ASP module separately establishes ASP sessions according to the instruction of the service module and based on the networks based on which the same service provided by the same service providing end is discovered.

S1008: Determine a first ASP session from ASP sessions that are established by the ASP module based on the networks based on which the same service provided by the same service providing end is discovered, and transmit, on the first ASP session established based on the first network, service data of the same service provided by the same service providing end.

Further, the first ASP session may be determined from the established ASP sessions according to a preset using rule, where the preset using rule may be a sequence in which service discovery is completed on the networks, or may be other information such as quality information of a network connection included in the network information reported by the ASP module. An upper layer service selects one according to the information, or an upper layer service selects one from the multiple networks and corresponding service providing ends according to information about a previous connection, or an upper layer service selects a service providing end according to other obtained information.

S1009: The service module transmits, on the second ASP session, the service data transmitted on the first ASP session in S1008, to continue current service data transmission.

The second ASP session is established based on a second network, and the second network is a network in networks based on which the same service provided by the same service providing end is discovered except the first network.

Further, this step may be triggered according to the current service transmission requirement. When the ASP module of the service request end reports, to the service module of the service request end, only two networks on which service discovery is completed and service providing ends discovered by using the two networks, the ASP module determines that a network in the two networks except the first network is the second network. Further, the preset using rule used to determine the first network may be the same as or may be different from the preset using rule used to determine the second network.

Further, step S1008 to step S1009 may be replaced with: transmitting, on established ASP sessions, service data of the same service provided by the same service providing end. For example, the service request end divides traffic of service data transmitted between the service request end and the service providing end equally according to a quantity of established ASP sessions and according to a transmission rule pre-agreed between the service request end and the service providing end, to perform transmission separately according to the ASP sessions, which can increase the transmission speed and improve the transmission efficiency.

The following describes, by using a specific application scenario exemplarily, the service discovery method provided in Embodiment 3.

Example 3

Figure 11A:
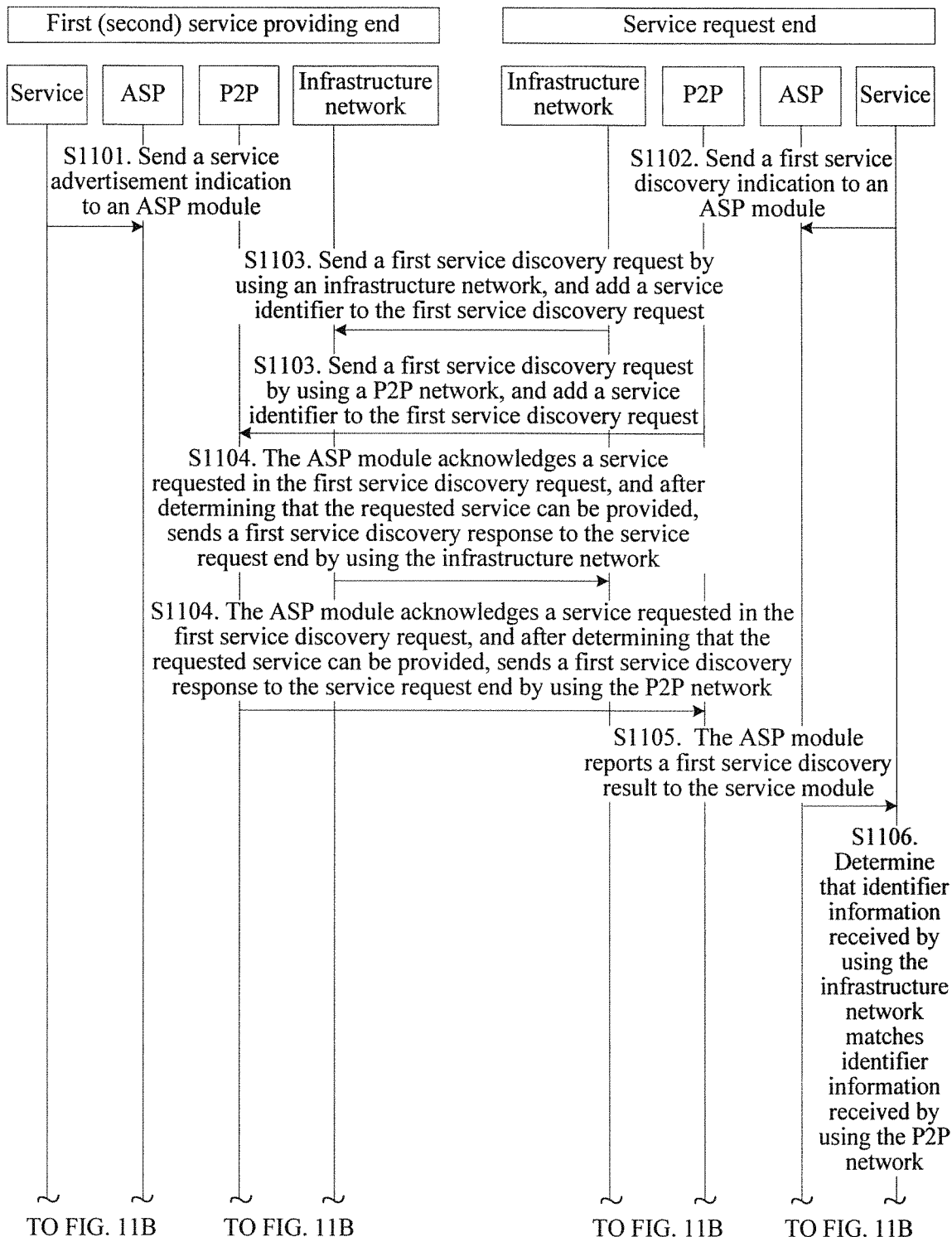
FIG. 11A and FIG. 11B are a flowchart of a service discovery method applied to a service providing end according to Embodiment 3 of the present disclosure.
Figure 11B:
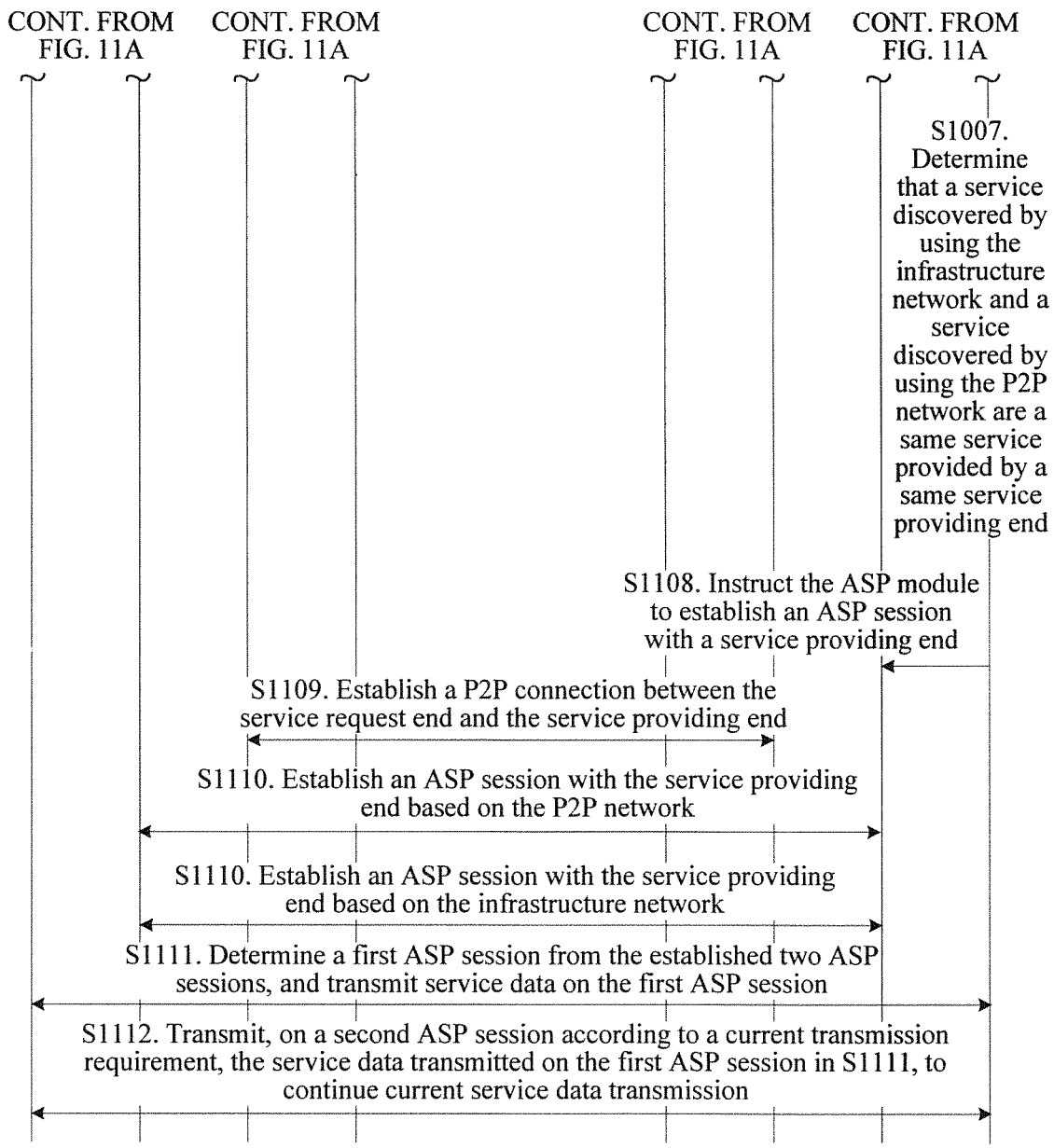

Using a Wi-Fi network to which a service request end (a terminal) connects as an example, assuming that the service request end connects to a P2P network and an infrastructure network, the service request end needs to display, by using a screen of a service providing end (a television), screen content of the service request end. Specifically, as shown in FIG. 11A and FIG. 11B, the service discovery method includes the following steps:

S1101: A service module of a service providing end sends a service advertisement indication to an ASP module of the service providing end, so that when a service request end sends a service discovery request, the service providing end can process the service discovery request.

S1102: A service module of the service request end sends a first service discovery indication to an ASP module of the service request end.

S1103: The ASP module of the service request end sends a first service discovery request according to the first service discovery indication received in S1102 and by using a P2P network and an infrastructure network, and adds a service identifier to the first service discovery request.

S1104: After the service providing end separately receives the first service discovery request by using the P2P network and the infrastructure network, the ASP module of the service providing end acknowledges a service requested in the first service discovery request, and after determining that the requested service can be provided, sends a first service discovery response to the service request end by using the P2P network and the infrastructure network.

The first service discovery response may carry identifier information, and further, may carry a service name.

Further, the premise under which the service discovery can be performed successfully by using the infrastructure network is: the service providing end and the service request end both establish connections to a same AP, or the service providing end and the service request end connect to different APs but the two different APs may communicate with each other.

Further, in step S1103 and step S1104, for implementation manners that may be used for the P2P network and the infrastructure network, refer to example 1, and details are not described herein again.

S1105: The ASP module of the service request end reports a first service discovery result obtained after the service discovery is performed by using the P2P network and the infrastructure network to the service module of the service request end.

The ASP module may report network address information (or the information is not included) corresponding to the P2P network, information about a service providing end discovered by using the P2P network, and a ServiceID received by using the P2P network, and report network address information (or the information is not included) of the infrastructure network on which the same service discovery completed on the P2P network is completed, information about a service providing end discovered by using the infrastructure network, and the ServiceID received by using the infrastructure network.

S1106: The service module of the service request end determines that identifier information received by using the infrastructure network matches identifier information received by using the P2P network.

S1107: The service module of the service request end determines that a service discovered by using the infrastructure network and a service discovered by using the P2P network are a same service provided by a same service providing end.

S1108: The service module of the service request end instructs the ASP module of the service request end to establish an ASP session with a service providing end.

S1109: Establish a P2P connection between the service request end and the service providing end.

S1110: The ASP module of the service request end establishes ASP sessions with the service providing end respectively based on the P2P network and the infrastructure network according to the received indication.

For example, the service module of the terminal instructs the ASP module of the terminal to establish ASP sessions with the television respectively based on the P2P network and the infrastructure network.

Further, there is no strict sequence between step S1109 and step S1110, as long as creation of a P2P connection is completed before an ASP session is established based on the P2P network.

S1111: The service module of the service request end determines a first ASP session from the established two ASP sessions, and transmits service data on the first ASP session.

Further, in this step, the first ASP session may be an ASP session established based on the infrastructure network or an ASP session established based on the P2P network.

S1112: Transmit, on a second ASP session according to a current transmission requirement, the service data transmitted on the first ASP session in S1111, to continue current service data transmission.

Further, in this step, when the first ASP session is the ASP session established based on the infrastructure network, the second ASP session is the ASP session established based on the P2P network; when the first ASP session is the ASP session established based on the P2P network, the second ASP session is the ASP session established based on the infrastructure network.

Embodiment 4

Figure 12:
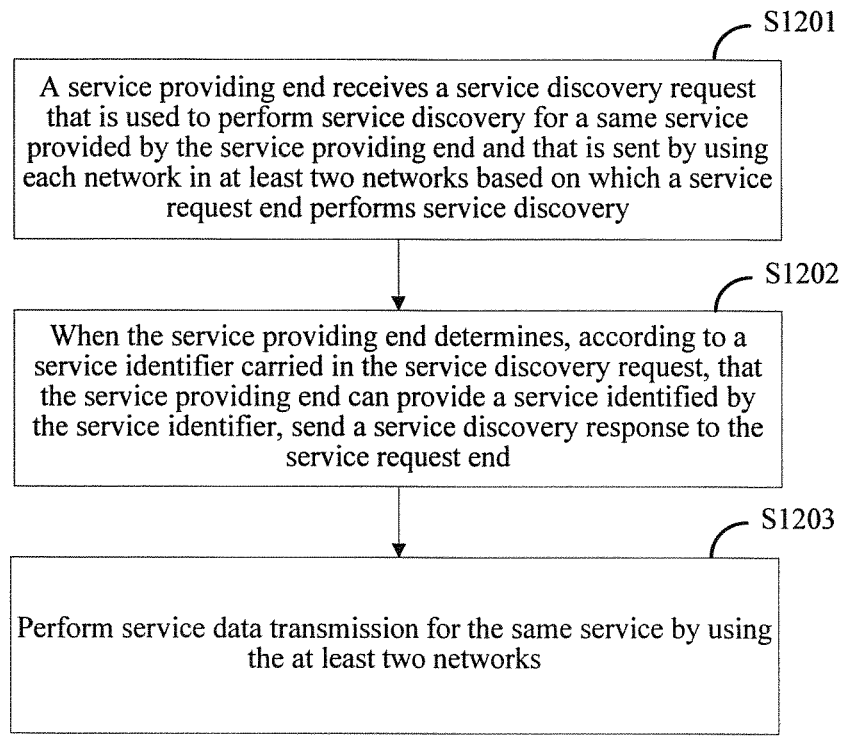
FIG. 12 is a flowchart of a service discovery method applied to a service providing end according to Embodiment 4 of the present disclosure.

Corresponding to the service discovery methods provided in Embodiment 1, Embodiment 2, and Embodiment 3, Embodiment 4 provides a service discovery method, applied to a service providing end side. As shown in FIG. 12, the method includes the following steps:

S1201: The service providing end receives a service discovery request that is used to perform service discovery for a same service provided by the service providing end and that is sent by using each network in at least two networks based on which a service request end performs service discovery.

S1202: When the service providing end determines, according to a service identifier carried in the service discovery request received in S1201, that the service providing end can provide a service identified by the service identifier, send a service discovery response to the service request end.

The service discovery response carries identifier information.

Further, in this embodiment, the service providing end may generate the identifier information by using a preset algorithm and based on a MAC address of the service providing end. For example, the identifier information may be directly the MAC address, or a value obtained after the MAC address is processed, or the MAC address and the service identifier, or a value obtained after the MAC address and the service identifier are processed together.

S1203: Perform service data transmission for the same service by using the at least two networks.

Further, the service request end may perform service discovery to the service providing end according to networks having different network addresses. No matter whether services requested by using different networks are a service requested by a same service request end, the service providing end provides the requested service for each network in the different networks and provides identifier information the network.

Based on a same invention idea, the embodiments of the present disclosure further provide a related device and a system. Because the problem resolving principle of the device, and the system is similar to that of the foregoing service discovery method, for implementation of the device and the system, refer to the implementation of the foregoing method, and repeated parts are not described herein again.

Figure 13:
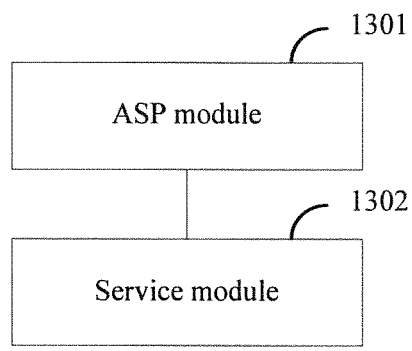
FIG. 13 is a schematic structural diagram of a first service request device according to an embodiment of the present disclosure.

As shown in FIG. 13, a first service request device provided in an embodiment of the present disclosure includes the following modules:

an application session platform ASP module 1301, configured to perform service discovery separately based on different networks, for a same service, and correspondingly receive, by using each network based on which the same service can be discovered in the different networks, identifier information provided by a service providing end providing the same service, where the identifier information is used to identify the service providing end; and a service module 1302, configured to: when identifier information obtained by the ASP module 1301 by using at least two networks matches, determine that services discovered after service discovery is performed based on the at least two networks are the same service provided by the same service providing end; and when accessing the same service at a time, perform service data transmission by using the at least two networks.

Further, the service module 1302 is further configured to: before the ASP module 1301 performs service discovery, send a first service discovery indication to the ASP module 1301: and the ASP module 1301 is specifically configured to: send, according to the first service discovery indication sent by the service module 1302 and by using a preset network, a first service discovery request including the same service, where the first service discovery request carries a service identifier of the same service, and the preset network includes a network in the different networks; and correspondingly receive, by using the network based on which the same service can be discovered in the preset network, a first service discovery response sent by the service providing end, where the first service discovery response carries the identifier information.

Further, the ASP module 1301 is further configured to: when receiving the first service discovery response by using at least one network, report a first service discovery result determined according to the first service discovery response to the service module 1302, where the first service discovery result includes network information of each network based on which the same service can be discovered, and information about a service providing end discovered by using each network based on which the same service can be discovered, or the first service discovery result includes information about a service providing end discovered by using each network based on which the same service can be discovered; and the service module 1302 is further configured to: instruct the ASP module 1301 to establish a first ASP session with a first service providing end, and transmit, by using the established first ASP session, service data of the same service discovered by using a first network, where the first service providing end is determined by the service module 1302 from the reported first service discovery result, and the first service providing end is discovered by using the first network.

Further, the service module 1302 is specifically configured to: determine, from the identifier information included in the reported first service discovery result, identifier information matching identifier information that is received by using the first network; when the identifier information matching the identifier information that is received by using the first network is determined, determine that a service that is discovered by using a network based on which the matched identifier information is received and a service that is discovered by using the first network are the same service provided by the same service providing end; instruct the ASP module 1301 to establish a second ASP session with a second service providing end, where the second service providing end is determined by the service module from service providing ends discovered by using the network based on which the matched identifier information is received, and the second service providing end is discovered by using a second network; and transmit, on the second ASP session, service data transmitted on the first ASP session, to continue current service data transmission, where the first service discovery result further includes identifier information that is received by using the network based on which the same service can be discovered.

Further, the service module 1302 is further configured to: before the ASP module 1301 performs service discovery, send a first service discovery indication to the ASP module 1301: and the ASP module 1301 is specifically configured to: send, according to the first service discovery indication sent by the service module 1302 and by using at least one network, a first service discovery request including the same service, where the first service discovery request carries a service identifier of the same service; correspondingly receive, by using the network based on which the same service can be discovered in the at least one network, a first service discovery response sent by the service providing end, where the first service discovery response carries the identifier information; and report a first service discovery result determined according to the first service discovery response to the service module 1302, where the first service discovery result includes network information of the network by using which the same service can be discovered, and information about a service providing end discovered by using the network based on which the same service can be discovered, or the first service discovery result includes information about a service providing end discovered by using the network based on which the same service can be discovered;

the service module 1302 is specifically configured to: after receiving the first service discovery result reported by the ASP module 1301, instruct the ASP module 1301 to establish a first ASP session with a first service providing end, where the first service providing end is determined by the service module 1302 from the reported first service discovery result, and the first service providing end is discovered by using a first network; transmit, by using the established first ASP session, service data of the same service discovered by using the first network; and send a second service discovery indication to the ASP module 1301; and the ASP module 1301 is specifically configured to: send, according to the second service discovery indication sent by the service module 1302 and by using at least one network, a second service discovery request including the same service, where the second service discovery request carries a service identifier of the same service; correspondingly receive, by using the network based on which the same service can be discovered in the at least one network, a second service discovery response sent by the service providing end, where the second service discovery response carries the identifier information; and report a second service discovery result determined according to the second service discovery response to the service module 1302, where the second service discovery result includes network information of the network by using which the same service can be discovered and that is determined according to the received second service discovery response, information about a service providing end discovered by using the network based on which the same service can be discovered, and identifier information received by using the network based on which the same service can be discovered, or the second service discovery result includes information about a service providing end discovered by using the network based on which the same service can be discovered and that is determined according to the received second service discovery response, and identifier infatuation received by using the network based on which the same service can be discovered.

Further, the service module 1302 is specifically configured to: determine, from the identifier information included in the second service discovery result reported by the ASP module 1301, identifier information matching the identifier information that is received by using the first network; when the identifier information matching the identifier information that is received by using the first network is determined, determine that a service that is discovered by using a network based on which the matched identifier information is received and a service that is discovered by using the first network are the same service provided by the same service providing end; instruct the ASP module 1301 to establish a second ASP session with a second service providing end; and transmit, on the second ASP session, the service data transmitted on the first ASP session, to continue current service data transmission, where the second service providing end is determined by the service module 1302 from a service providing end discovered by using the network based on which the matched identifier information is received, and the second providing end is discovered by using a second network.

Further, the ASP module 1301 is further configured to: when receiving the first service discovery response by using at least two networks, report a first service discovery result determined according to the first service discovery response to the service module 1302, where the first service discovery result includes network information of each network based on which the same service can be discovered, information about a service providing end discovered by using each network based on which the same service can be discovered, and identifier information received by using each network based on which the same service can be discovered, or the first service discovery result includes information about a service providing end discovered by using each network based on which the same service can be discovered, and identifier information received by using each network based on which the same service can be discovered;

the service module 1302 is specifically configured to: determine matched identifier information from the identifier information reported by the ASP module 1301; and when the matched identifier information is determined, determine that services discovered by using networks based on which the matched identifier information is received are the same service provided by the same service providing end; and the service module 1302 is further configured to: after determining that the services discovered by using the networks based on which the matched identifier information is received are the same service provided by the same service providing end, instruct the ASP module 1301 to establish an ASP session with the same service providing end providing the same service; and determine a first ASP session from ASP sessions that are established by the ASP module 1301 based on networks based on which the same service provided by the same service providing end is discovered, and transmit, on the first ASP session established based on the first network, service data of the same service provided by the same service providing end.

Further, the service module 1302 is specifically configured to transmit, on the second ASP session, the service data transmitted on the first ASP session, to continue current service data transmission, where the second ASP session is established based on a second network, and the second network is a network determined in networks based on which the same service provided by the same service providing end is discovered except the first network.

Further, the ASP module 1301 is further configured to: when receiving the first service discovery response by using at least two networks, report a first service discovery result determined according to the first service discovery response to the service module 1302, where the first service discovery result includes network information of each network based on which the same service can be discovered, information about a service providing end discovered by using each network based on which the same service can be discovered, and identifier information received by using each network based on which the same service can be discovered, or the first service discovery result includes information about a service providing end discovered by using each network based on which the same service can be discovered, and identifier information received by using each network based on which the same service can be discovered;

the service module 1302 is specifically configured to: determine matched identifier information from the identifier information reported by the ASP module 1301; and when the matched identifier information is determined, determine that services discovered by using networks based on which the matched identifier information is received are the same service provided by the same service providing end;

the service module 1302 is further configured to: after determining that the services discovered by using the networks based on which the matched identifier information is received are the same service provided by the same service providing end, instruct the ASP module 1301 to establish an ASP session with the same service providing end providing the same service; and the service module 1302 is specifically configured to transmit, on the established ASP session, service data of the same service provided by the same service providing end.

Further, the service module 1302 is specifically configured to: stop using a first port to exchange service data with the service providing end, where the first port is an available port, used by a service session borne on the first ASP session, of a network address corresponding to the first network; and exchange, with the service providing end by using a second port, service data following the last service data that is exchanged with the service providing end by using the first port, where the second port is an available port, used by a service session borne on the second session, of a network address corresponding to the second network.

Further, the identifier information is generated by the identified service providing end based on a MAC address of the service providing end.

Further, the ASP module 1301 is specifically configured to: when the network by using which the same service can be discovered includes a P2P network, establish a P2P connection between the service request end and the service providing end; and establish an ASP session based on the established P2P connection.

Further, the different networks are at least two different networks of the following different types of networks: a wired network, an infrastructure network, a P2P network, a Bluetooth network, an NFC network, an LTE network, or a Powerline network.

Figure 14:
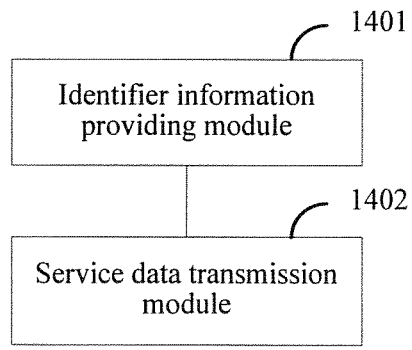
FIG. 14 is a schematic structural diagram of a first service providing device according to an embodiment of the present disclosure.

As shown in FIG. 14, a first service providing device provided in an embodiment of the present disclosure includes the following modules:

an identifier information providing module 1401, configured to provide, by using each network in at least two networks based on which a service request end performs service discovery for a same service provided by the service providing device, identifier information for the service request end, where the identifier information is used to identify the service providing end; and a service data transmission module 1402, configured to perform service data transmission for the same service by using the at least two networks.

Further, the identifier information providing module 1401 is specifically configured to: receive a service discovery request that is used to perform service discovery for the same service provided by the service providing device and that is sent by using each network in the at least two networks based on which the service request end performs service discovery; and when the service providing device determines, according to a service identifier carried in the service discovery request, that the service providing device can provide a service identified by the service identifier, send a service discovery response to the service request end, where the service discovery response carries the identifier information.

A first service discovery system provided in an embodiment of the present disclosure includes the foregoing first service request device and the foregoing first service providing device.

Based on a same invention idea, the embodiments of the present disclosure further provide a related device and a system. Because the problem resolving principle of the device, and the system is similar to that of the foregoing service discovery method, for implementation of the device and the system, refer to the implementation of the foregoing method, and repeated parts are not described herein again.

Figure 15:
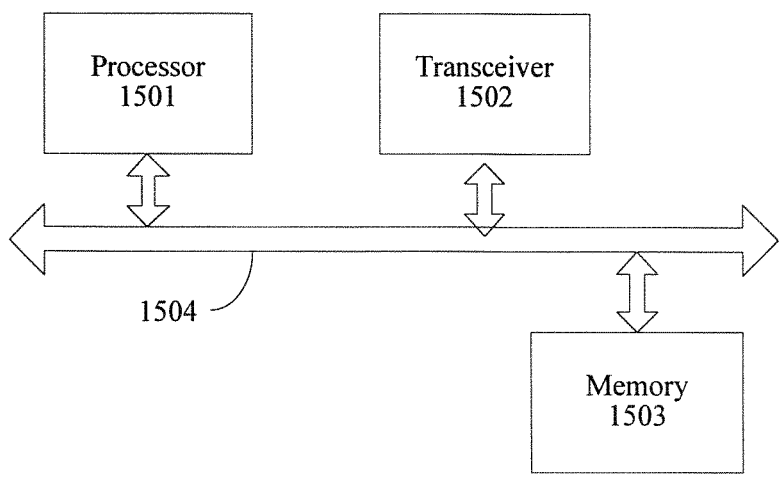
FIG. 15 is a schematic structural diagram of a second service request device according to an embodiment of the present disclosure.

As shown in FIG. 15, a second service request device provided in an embodiment of the present disclosure includes a processor 1501 (there may be one or more processors, and one processor is used as an example in each embodiment of the present disclosure), a transceiver 1502, a memory 1503, and a bus system 1504.

The processor 1501 controls operation of the second service request device, and the processor 1501 may be referred to as a CPU (Central Processing Unit, central processing unit). The processor 1501 may be an integrated circuit chip and has a signal processing capability. The processor 1501 may also be a general purpose processor, a digital signal processor (DSP, Digital Signal Processor), an application-specific integrated circuit (ASIC, Application Specific Integrated Circuit), a field programmable gate array (FPGA, Field Programmable Gate Array), another programmable logic device, a discrete gate, a transistor logic device, or a discrete hardware component. The general purpose processor may be a microprocessor or the processor may be any conventional processor or the like.

The memory 1503 may include a read-only memory and a random access memory, and provides an instruction and data for the processor 1501. A part of the memory 1503 may further include a non-volatile random access memory (NVRAM).

Components of the second service request device are coupled together by using the bus system 1504, where in addition to a data bus, the bus system 1503 includes a power bus, a control bus, a status signal bus, and the like. The bus system may be an ISA (Industry Standard Architecture, Industry Standard Architecture) bus, a PCI (Peripheral Component Interconnect, peripheral component interconnect) bus, an EISA (Extended Industry Standard Architecture, Extended Industry Standard Architecture) bus, or the like. The bus may be one or more physical lines, and when the bus is multiple physical lines, the bus may be classified into an address bus, a data bus, a control bus, and the like. In some other embodiments of the present disclosure, the processor 1501, the memory 1503, and the transmitter 1502 may also be directly connected by using a communications line. However, for clear description, various types of buses in the figure are marked as the bus system 1504.

The memory 1503 stores the following elements, executable modules, or data structures, or a subset thereof, or an extension set thereof:

an operation instruction: including various operation instructions, used to implement various operations; and an operating system: including various system programs, used to implement various basic services and process a hardware-based task.

In this embodiment of the present disclosure, the processor 1501 performs the following operations by invoking the operation instruction (where the operation instruction may be stored in the operating system) stored in the memory 1503.

The transceiver 1502 is configured to perform service discovery separately based on different networks, for a same service, and correspondingly receive, by using each network based on which the same service can be discovered in the different networks, identifier information provided by a service providing end providing the same service, where the identifier information is used to identify the service providing end; and the processor 1501 is configured to: when identifier information obtained by the transceiver 1502 by using at least two networks matches, determine that services discovered after service discovery is performed based on the at least two networks are the same service provided by the same service providing end; and when accessing the same service at a time, perform service data transmission by using the at least two networks.

Further, the processor 1501 is further configured to: before the transceiver 1502 performs service discovery, send a first service discovery indication to the transceiver 1502: and the transceiver 1502 is specifically configured to: send, according to the first service discovery indication sent by the processor 1501 and by using a preset network, a first service discovery request including the same service, where the first service discovery request carries a service identifier of the same service, and the preset network includes a network in the different networks; and correspondingly receive, by using the network based on which the same service can be discovered in the preset network, a first service discovery response sent by the service providing end, where the first service discovery response carries the identifier information.

Further, the transceiver 1502 is further configured to: when receiving the first service discovery response by using at least one network, report a first service discovery result determined according to the first service discovery response to the processor 1501, where the first service discovery result includes network information of each network based on which the same service can be discovered, and information about a service providing end discovered by using each network based on which the same service can be discovered, or the first service discovery result includes information about a service providing end discovered by using each network based on which the same service can be discovered; and the processor 1501 is further configured to: instruct the transceiver 1502 to establish a first ASP session with a first service providing end, and transmit, by using the established first ASP session, service data of the same service discovered by using a first network, where the first service providing end is determined by the processor 1501 from the reported first service discovery result, and the first service providing end is discovered by using the first network.

Further, the processor 1501 is specifically configured to: determine, from the identifier information included in the reported first service discovery result, identifier information matching identifier information that is received by using the first network; when the identifier information matching the identifier information that is received by using the first network is determined, determine that a service that is discovered by using a network based on which the matched identifier information is received and a service that is discovered by using the first network are the same service provided by the same service providing end; instruct the transceiver 1502 to establish a second ASP session with a second service providing end, where the second service providing end is determined by the processor 1501 from a service providing end discovered by using the network based on which the matched identifier information is received, and the second service providing end is discovered by using a second network; and transmit, on the second ASP session, the service data transmitted on the first ASP session, to continue current service data transmission, where the first service discovery result further includes identifier information that is received by using the network based on which the same service can be discovered.

Further, the processor 1501 is further configured to: before the transceiver 1502 performs service discovery, send a first service discovery indication to the transceiver 1502:

the transceiver 1502 is specifically configured to: send, according to the first service discovery indication sent by the processor 1501 and by using at least one network, a first service discovery request including the same service, where the first service discovery request carries a service identifier of the same service; correspondingly receive, by using the network based on which the same service can be discovered in the at least one network, a first service discovery response sent by the service providing end, where the first service discovery response carries the identifier information; and report a first service discovery result determined according to the first service discovery response to the processor 1501, where the first service discovery result includes network information of the network by using which the same service can be discovered, and information about a service providing end discovered by using the network based on which the same service can be discovered, or the first service discovery result includes information about a service providing end discovered by using the network based on which the same service can be discovered;

the processor 1501 is specifically configured to: after receiving the first service discovery result reported by the transceiver 1502, instruct the transceiver 1502 to establish a first ASP session with a first service providing end, where the first service providing end is determined by the processor 1501 from the reported first service discovery result, and the first service providing end is discovered by using a first network; transmit, by using the established first ASP session, service data of the same service discovered by using the first network; and send a second service discovery indication to the transceiver 1502; and the transceiver 1502 is specifically configured to: send, according to the second service discovery indication sent by the processor 1501 and by using at least one network, a second service discovery request including the same service, where the second service discovery request carries a service identifier of the same service; correspondingly receive, by using the network based on which the same service can be discovered in the at least one network, a second service discovery response sent by the service providing end, where the second service discovery response carries the identifier information; and report a second service discovery result determined according to the second service discovery response to the processor 1501, where the second service discovery result includes network information of the network by using which the same service can be discovered and that is determined according to the received second service discovery response, information about a service providing end discovered by using the network based on which the same service can be discovered, and identifier information received by using the network based on which the same service can be discovered, or the second service discovery result includes information about a service providing end discovered by using the network based on which the same service can be discovered and that is determined according to the received second service discovery response, and identifier information received by using the network based on which the same service can be discovered.

Further, the processor 1501 is specifically configured to: determine, from the identifier information included in the second service discovery result reported by the transceiver 1502, identifier information matching the identifier information that is received by using the first network; when the identifier information matching the identifier information that is received by using the first network is determined, determine that a service that is discovered by using a network based on which the matched identifier information is received and a service that is discovered by using the first network are the same service provided by the same service providing end; instruct the transceiver 1502 to establish a second ASP session with a second service providing end; and transmit, on the second ASP session, the service data transmitted on the first ASP session, to continue current service data transmission, where the second service providing end is determined by the processor 1501 from a service providing end discovered by using the network based on which the matched identifier information is received, and the second providing end is discovered by using a second network.

Further, the transceiver 1502 is further configured to: when receiving the first service discovery response by using at least two networks, report a first service discovery result determined according to the first service discovery response to the processor 1501, where the first service discovery result includes network information of each network based on which the same service can be discovered, information about a service providing end discovered by using each network based on which the same service can be discovered, and identifier information received by using each network based on which the same service can be discovered, or the first service discovery result includes information about a service providing end discovered by using each network based on which the same service can be discovered, and identifier information received by using each network based on which the same service can be discovered;

the processor 1501 is specifically configured to: determine matched identifier information from the identifier information reported by the transceiver 1502; and when the matched identifier information is determined, determine that services discovered by using networks based on which the matched identifier information is received are the same service provided by the same service providing end; and the processor 1501 is further configured to: after determining that the services discovered by using the networks based on which the matched identifier information is received are the same service provided by the same service providing end, instruct the transceiver 1502 to establish an ASP session with the same service providing end providing the same service; determine a first ASP session from ASP sessions that are established by the transceiver 1502 based on networks based on which the same service provided by the same service providing end is discovered; and transmit, on the first ASP session established based on the first network, service data of the same service provided by the same service providing end.

Further, the processor 1501 is specifically configured to transmit, on the second ASP session, the service data transmitted on the first ASP session, to continue current service data transmission, where the second ASP session is established based on a second network, and the second network is a network determined in the networks based on which the same service provided by the same service providing end is discovered except the first network.

Further, the transceiver 1502 is further configured to: when receiving the first service discovery response by using at least two networks, report a first service discovery result determined according to the first service discovery response to the processor 1501, where the first service discovery result includes network information of each network based on which the same service can be discovered, information about a service providing end discovered by using each network based on which the same service can be discovered, and identifier information received by using each network based on which the same service can be discovered, or the first service discovery result includes information about a service providing end discovered by using each network based on which the same service can be discovered, and identifier information received by using each network based on which the same service can be discovered;

the processor 1501 is specifically configured to: determine matched identifier information from the identifier information reported by the transceiver 1502; and when the matched identifier information is determined, determine that services discovered by using networks based on which the matched identifier information is received are the same service provided by the same service providing end;

the processor 1501 is further configured to: after determining that the services discovered by using the networks based on which the matched identifier information is received are the same service provided by the same service providing end, instruct the transceiver 1502 to establish an ASP session with the same service providing end providing the same service; and the processor 1501 is specifically configured to transmit, on the established ASP session, service data of the same service provided by the same service providing end.

Further, the processor 1501 is specifically configured to: stop using a first port to exchange service data with the service providing end, where the first port is an available port, used by a service session borne on the first ASP session, of a network address corresponding to the first network; and exchange, with the service providing end by using a second port, service data following the last service data that is exchanged with the service providing end by using the first port, where the second port is an available port, used by a service session borne on the second session, of a network address corresponding to the second network.

Further, the identifier information is generated by the identified service providing end based on a MAC address of the service providing end.

Further, the transceiver 1502 is specifically configured to: when the network by using which the same service can be discovered includes a P2P network, establish a P2P connection between the service request end and the service providing end; and establish an ASP session based on the established P2P connection.

Further, the different networks are at least two different networks of the following different types of networks: a wired network, an infrastructure network, a P2P network, a Bluetooth network, an NFC network, an LTE network, or a Powerline network.

Figure 16:
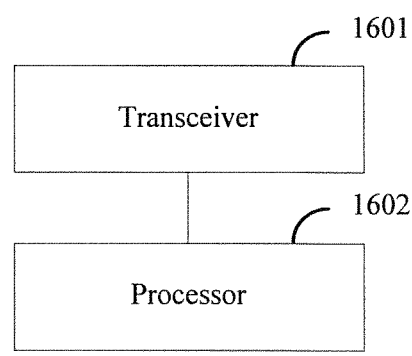
FIG. 16 is a schematic structural diagram of a second service providing device according to an embodiment of the present disclosure.

As shown in FIG. 16, a second service providing device provided in an embodiment of the present disclosure includes:

a transceiver 1601, configured to provide, by using each network in at least two networks based on which a service request end performs service discovery for a same service provided by the service providing device, identifier information for the service request end, where the identifier information is used to identify the service providing end; and a processor 1602, configured to perform service data transmission for the same service by using the at least two networks.

Further, the transceiver 1601 is specifically configured to: receive a service discovery request that is used to perform service discovery for the same service provided by the service providing device and that is sent by using each network in the at least two networks based on which the service request end performs service discovery; and when the service providing device determines, according to a service identifier carried in the service discovery request, that the service providing device can provide a service identified by the service identifier, send a service discovery response to the service request end, where the service discovery response carries the identifier information.

A second service discovery system provided in an embodiment of the present disclosure includes the foregoing second service request device and the foregoing second service providing device.

Functions of the foregoing units may correspond to corresponding processing steps in the process shown in FIG. 1 to FIG. 12, and details are not described herein again.

In the service discovery method, the related device, and the system that are provided in the embodiments of the present disclosure, a service request end performs service discovery separately based on different networks, for a same service; correspondingly receives, by using each network based on which the same service can be discovered in the different networks, identifier information provided by a service providing end providing the same service, where the identifier information is used to identify the service providing end; when identifier information obtained by using at least two networks matches, determines that services discovered after service discovery is performed based on the at least two networks are the same service provided by the same service providing end; and when accessing the same service at a time, performs service data transmission by using the at least two networks. In the service discovery method provided in the embodiments of the present disclosure, the service request end may perform service discovery by using different networks, for the same service, and determines the same service that is provided by the same service providing end discovered by using different networks. Then, after service data transmission is performed by using a first network, when the first network cannot satisfy a current service data transmission requirement, because in addition to the first network, a service, that is, a current service, the same as the service provided by the same service providing end is further discovered by using another network, the service request end may switch the first network to the another network, and continue the current service data transmission by using the another network. Compared with the prior art that because a bottom-layer connection on which data transmission of an upper layer service is based is disrupted, the data transmission of the upper layer service is interrupted, in the embodiments of the present disclosure, data transmission of an upper layer service does not rely much on a bottom-layer connection on which the upper layer service is based, and switching of a bottom-layer network enables continuous transmission of service data, thereby improving flexibility of service transmission. In addition, in some cases, service transmission may be performed by using multiple networks simultaneously, and a service may be handed over between multiple networks.

Based on the foregoing descriptions of the embodiments, a person skilled in the art may clearly understand that the present disclosure may be implemented by hardware or by software in addition to a necessary general hardware platform. Based on such understanding, the technical solutions of the embodiments of the present disclosure may be implemented in a form of a software product. The software product may be stored in a non-volatile storage medium (which may be a CD-ROM, a USB flash drive, or the like) and includes several instructions for instructing a computer device (which may be a personal computer, a server, a network device, or the like) to perform the methods in the embodiments of the present disclosure.

A person skilled in the art may understand that the accompanying drawings are merely schematic diagrams of exemplary embodiments, and modules or processes in the accompanying drawings are not necessarily required for implementing the present disclosure.

A person skilled in the art may understand that the modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or split into a plurality of submodules.

The sequence numbers of the foregoing embodiments of the present disclosure are merely for illustrative purposes, and are not intended to indicate priorities of the embodiments.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A service discovery method, comprising:
performing, by a service request end, service discovery for a same service separately through different networks;
receiving, from each network through which the same service can be discovered, identifier information regarding an identification of a service providing end providing the same service through the network, the network being in the different networks;
when identifier information received from at least two networks matches, determining, by the service request end, that services discovered by the service discovery through the at least two networks are the same service provided by a same service providing end; and
performing service data transmission through the at least two networks to access the same service at a same time.

2. The method according to claim 1, wherein:
performing, by the service request end, service discovery for the same service separately through different networks comprises:
sending, by a service module of the service request end, a first service discovery indication to an application session platform (ASP) module of the service request end, and
sending, by the ASP module according to the first service discovery indication through a preset network, a first service discovery request comprising the same service, wherein the first service discovery request carries a service identifier of the same service, and the preset network comprises at least one network in the different networks; and
receiving, from each network through which the same service can be discovered, identifier information provided by the service providing end providing the same service through the network comprises:
correspondingly and separately receiving, by the ASP module from the network through which the same service can be discovered in the preset network, a first service discovery response sent by the service providing end, wherein the first service discovery response carries the identifier information.

3. The method according to claim 2, wherein when the ASP module receives the first service discovery response through at least one network, the method further comprises:
reporting, by the ASP module, a first service discovery result determined according to the first service discovery response to the service module, wherein the first service discovery result comprises network information of each network through which the same service can be discovered, and/or information about the service providing end discovered through the network;
instructing, by the service module, the ASP module to establish a first ASP session with a first service providing end, wherein the first service providing end is determined by the service module from the reported first service discovery result, and the first service providing end is discovered through a first network; and
transmitting, by the service module through the established first ASP session, service data of the same service discovered through the first network.

4. The method according to claim 3, wherein:
the first service discovery result further comprises identifier information received from the network through which the same service can be discovered;
determining, by the service request end, that services discovered after service discovery is performed based on the at least two networks are the same service provided by the same service providing end comprises:
determining, by the service module from the identifier information in the reported first service discovery result, identifier information matching identifier information received from the first network, and when the identifier information matching the identifier information received from the first network is determined, determining that a service discovered through a network from which the matched identifier information is received and the service discovered through the first network are the same service provided by the same service providing end; and performing service data transmission through the at least two networks comprises:

instructing, by the service module, the ASP module to establish a second ASP session with a second service providing end, wherein the second service providing end is determined by the service module from service providing end/ends discovered through the network from which the matched identifier information is received, and the second service providing end is discovered through a second network, and transmitting, on the second ASP session, the service data transmitted on the first ASP session, to continue current service data transmission.

5. The method according to claim 1, wherein performing, by the service request end, service discovery for the same service separately through the different networks comprises:

sending, by a service module of the service request end, a first service discovery indication to an ASP module of the service request end; and sending, by the ASP module according to the first service discovery indication through at least one network, a first service discovery request comprising the same service, wherein the first service discovery request carries a service identifier of the same service; and, wherein receiving, from each network through which the same service can be discovered, identifier information regarding the identification of a service providing end providing the same service through the network, the network being in the different networks comprises:

receiving, by the ASP module through a network through which the same service can be discovered in the at least one network, a first service discovery response sent by the service providing end, wherein the first service discovery response carries the identifier information;

reporting, by the ASP module, a first service discovery result determined according to the first service discovery response to the service module, wherein the first service discovery result comprises network information of the network through which the same service can be discovered, and information about a service providing end discovered through the network through which the same service can be discovered, or the first service discovery result comprises information about a service providing end discovered through the network through which the same service can be discovered;

instructing, by the service module, the ASP module to establish a first ASP session with a first service providing end, wherein the first service providing end is determined by the service module from the reported first service discovery result, and the first service providing end is discovered through a first network;

transmitting, by the service module through the established first ASP session, service data of the same service discovered through the first network;

sending, by the service module, a second service discovery indication to the ASP module;

sending, by the ASP module according to the second service discovery indication through at least one network, a second service discovery request comprising the same service, wherein the second service discovery request carries the service identifier of the same service;

receiving, by the ASP module through a network through which the same service can be discovered in the at least one network, a second service discovery response sent by the service providing end, wherein the second service discovery response carries the identifier information; and reporting, by the ASP module, a second service discovery result determined according to the second service discovery response to the service module, wherein the second service discovery result comprises network information of the network through which the same service can be discovered and that is determined according to the received second service discovery response, information about a service providing end discovered through the network through which the same service can be discovered, and identifier information received through the network through which the same service can be discovered, or the second service discovery result comprises information about a service providing end discovered through the network through which the same service can be discovered and that is determined according to the received second service discovery response, and identifier information received through the network through which the same service can be discovered.

6. The method according to claim 5, wherein:

determining, by the service request end, that services discovered through the service discovery through the at least two networks are the same service provided by the same service providing end comprises:

determining, by the service module from the identifier information in the reported second service discovery result, identifier information matching identifier information received from the first network, and when the identifier information matching the identifier information received from the first network is determined, determining that a service discovered through a network from which the matched identifier information is received and the service discovered through the first network are the same service provided by the same service providing end; and performing service data transmission through the at least two networks comprises:

instructing, by the service module, the ASP module to establish a second ASP session with a second service providing end, wherein the second service providing end is determined by the service module from service providing ends discovered through the network from which the matched identifier information is received, and the second providing end is discovered through a second network, and transmitting, on the second ASP session, the service data transmitted on the first ASP session, to continue current service data transmission.

7. The method according to claim 2, wherein:

when the ASP module receives the first service discovery response through at least two networks, the method further comprises:

reporting, by the ASP module, a first service discovery result determined according to the first service discovery response to the service module, wherein the first service discovery result comprises at least one of the: network information of each network through which the same service can be discovered, information about a service providing end discovered through each network through which the same service can be discovered, and identifier information received through each network through which the same service can be discovered, or information about a service providing end discovered through each network through which the same service can be discovered, and identifier information received through each network through which the same service can be discovered; and wherein determining that services discovered after service discovery is performed based on the at least two networks are the same service provided by the same service providing end comprises:

determining, by the service module, the matched identifier information from the reported identifier information, and when the matched identifier information is determined, determining that services discovered through networks through which the matched identifier information is received are the same service provided by the same service providing end; and after determining that services discovered through networks through which the matched identifier information is received are the same service provided by the same service providing end, the method further comprises:

instructing, by the service module, the ASP module to establish an ASP session with the same service providing end providing the same service, and determining a first ASP session from ASP sessions that are established by the ASP module based on networks through which the same service provided by the same service providing end is discovered, and transmitting, on the first ASP session established based on a first network, service data of the same service provided by the same service providing end.

8. The method according to claim 7, wherein performing service data transmission through the at least two networks comprises:

transmitting, by the service module on a second ASP session, the service data transmitted on the first ASP session, to continue current service data transmission, wherein the second ASP session is established based on a second network, and the second network is a network determined in the networks through which the same service provided by the same service providing end is discovered except the first network.

9. The method according to claim 2, wherein:

when the ASP module receives the first service discovery response through at least two networks, the method further comprises:

reporting, by the ASP module, a first service discovery result determined according to the first service discovery response to the service module, wherein the first service discovery result comprises at least one of:

network information of each network through which the same service can be discovered, information about a service providing end discovered through each network through which the same service can be discovered, and identifier information received through each network through which the same service can be discovered, or information about a service providing end discovered through each network through which the same service can be discovered, and identifier information received through each network through which the same service can be discovered;

determining that services discovered after service discovery is performed based on the at least two networks are the same service provided by the same service providing end comprises:

determining, by the service module, the matched identifier information from the reported identifier information, and when the matched identifier information is determined, determining that services discovered through networks through which the matched identifier information is received are the same service provided by the same service providing end;

after determining that services discovered through networks through which the matched identifier information is received are the same service provided by the same service providing end, the method further comprises:

instructing, by the service module, the ASP module to establish an ASP session with the same service providing end providing the same service; and when accessing the same service at a time, performing service data transmission through the at least two networks comprises:

transmitting, on the established ASP session, service data of the same service provided by the same service providing end.

10. The method according to claim 4, wherein transmitting, on the second ASP session, the service data transmitted on the first ASP session, to continue current service data transmission comprises:

stopping using, by the service module, a first port to exchange service data with the service providing end, wherein the first port is an available port, used by a service session borne on the first ASP session, of a network address corresponding to the first network; and exchanging, with the service providing end through a second port, service data following the last service data that is exchanged with the service providing end through the first port, wherein the second port is an available port, used by a service session borne on the second session, of a network address corresponding to the second network.

11. The method according to claim 1, wherein the identifier information is generated by the identified service providing end based on a media access control (MAC) address of the service providing end.

12. The method according to claim 3, wherein:

the network through which the same service can be discovered comprises a peer to peer (P2P) network; and creating an ASP session based on the P2P network comprises:

creating a P2P connection between the service request end and the service providing end, and creating the ASP session based on the established P2P connection.

13. The method according to claim 1, wherein the different networks are at least two different networks of the following different types of networks: a wired network, an infrastructure network, a peer to peer (P2P) network, a Bluetooth network, an near field communication (NFC) network, an long term evolution (LTE) network, or a Powerline network.

14. A service discovery method, comprising:

providing, by a service providing end through each network in at least two networks through which a service request end performs service discovery for a same service provided by the service providing end, identifier information for the service request end, wherein the identifier information identifies the service providing end; and performing service data transmission for the same service through the at least two networks.

15. The method according to claim 14, wherein providing, through each network in at least two networks through which a service request end performs service discovery for a same service provided by the service providing end, identifier information for the service request end comprises:
receiving a service discovery request sent through each network in the at least two networks through which the service request end performs service discovery, the service discover request being for performing the service discovery through the at least two networks; and
when the service providing end determines, according to a service identifier carried in the service discovery request, that the service providing end can provide a service identified by the service identifier, sending a service discovery response to the service request end, wherein the service discovery response carries the identifier information.

16. A service request device, comprising:
a transceiver configured to:
perform service discovery separately through different networks, for a same service, and
receive, from each network through the same service can be discovered, identifier information regarding an identification of a service providing end providing the same service through the network, the network being in the different networks; and
a processor, configured to:
when identifier information received from at least two networks matches, determining, by the service request end, that services discovered by the service discovery through the at least two networks are the same service provided by a same service providing end, and
perform service data transmission through the at least two networks to access the same service at a same time.

17. The device according to claim 16, wherein:
the processor is further configured to: before the transceiver performs service discovery, send a first service discovery indication to the transceiver; and
the transceiver is configured to:
send, according to the first service discovery indication sent by the processor and through a preset network, a first service discovery request including the same service, wherein the first service discovery request carries a service identifier of the same service, and the preset network includes a network in the different networks, and
correspondingly receive, through the network through which the same service can be discovered in the preset network, a first service discovery response sent by the service providing end, wherein the first service discovery response carries the identifier information.

18. The device according to claim 17, wherein:
the transceiver is further configured to: when receiving the first service discovery response through at least one network, report a first service discovery result determined according to the first service discovery response to the processor, wherein the first service discovery result comprises,
network information of each network through which the same service can be discovered, and information about a service providing end discovered through each network through which the same service can be discovered, or
information about a service providing end discovered through each network through which the same service can be discovered; and
the processor is further configured to:
instruct the transceiver to establish a first ASP session with a first service providing end, and
transmit, through the established first ASP session, service data of the same service discovered through a first network, wherein the first service providing end is determined by the processor from the reported first service discovery result, and the first service providing end is discovered through the first network.

19. The device according to claim 18, wherein the processor is configured to:
determine, from the identifier information included in the reported first service discovery result, identifier information matching identifier information that is received through the first network;
when the identifier information matching the identifier information that is received through the first network is determined, determine that a service that is discovered through a network through which the matched identifier information is received and a service that is discovered through the first network are the same service provided by the same service providing end;
instruct the transceiver to establish a second ASP session with a second service providing end, wherein the second service providing end is determined by the processor from a service providing end discovered through the network through which the matched identifier information is received, and the second service providing end is discovered through a second network; and
transmit, on the second ASP session, the service data transmitted on the first ASP session, to continue current service data transmission, where the first service discovery result further includes identifier information that is received through the network through which the same service can be discovered.

20. A service providing device, comprising:
a transceiver configured to provide, through each network in at least two networks through which a service request end performs service discovery for a same service provided by the service providing device, identifier information for the service request end, wherein the identifier information identifies the service providing end; and
a processor configured to perform service data transmission for the same service through the at least two networks.

* * * * *